United States Patent [19]
Saito et al.

[11] Patent Number: 5,838,249
[45] Date of Patent: Nov. 17, 1998

[54] CONTROL/SUPERVISORY SIGNAL TRANSMISSION/RECEPTION SYSTEM

[75] Inventors: Yoshitane Saito; Kazuo Itani, both of Nagaokakyo; Yuji Watanabe; Takeharu Katsuno, both of Kawasaki, all of Japan

[73] Assignees: NKE Co., Ltd., Kyoto; Kuroda Precision Industries Ltd., Kawasaki, both of Japan

[21] Appl. No.: 713,789

[22] Filed: Sep. 13, 1996

[30] Foreign Application Priority Data

Sep. 14, 1995 [JP] Japan .................................... 7-236848

[51] Int. Cl.$^6$ ...................................................... H04Q 1/00
[52] U.S. Cl. ........................................ 340/825.06; 370/470
[58] Field of Search ........................ 340/825.06, 825.07, 340/825.08, 825.44; 370/470, 471

[56] References Cited

U.S. PATENT DOCUMENTS

| | | | |
|---|---|---|---|
| 4,418,333 | 11/1983 | Schwarzbach | 340/825.07 |
| 4,423,414 | 12/1983 | Bryant | 340/825.07 |
| 4,755,792 | 7/1988 | Pezzolo | 340/825.06 |
| 4,897,835 | 1/1990 | Gaskill | 340/825.44 |
| 4,937,568 | 6/1990 | Nakanishi et al. | 340/825.06 |
| 5,223,826 | 6/1993 | Amou et al. | 340/825.06 |
| 5,247,292 | 9/1993 | Nakanishi et al. | 340/825.06 |
| 5,251,207 | 10/1993 | Abensour | 370/470 |
| 5,365,224 | 11/1994 | McKeechnie | 370/470 |
| 5,566,343 | 10/1996 | Nishiguchi | 340/470 |

OTHER PUBLICATIONS

Data Communications, Networks, and Systems. 172–173. Thomas Bartee, 1991.

*Primary Examiner*—Brian Zimmerman
*Attorney, Agent, or Firm*—McGlew and Tuttle

[57] ABSTRACT

A control/supervisory signal transmission/reception system includes a central station and a number of local stations which are interconnected by a common data line carrying a three-level voltage signal so as to transfer data signals between the central and local stations. Information concerning structures and functions of the local stations is grasped automatically by using frames having ID codes differing from one to another frame, whereby the central station can check occurrence of breakage of the transmission line or shut-down of the local station inclusive of the units to be controlled/supervised associated with the local station. The frame includes a start signal field, a data signal field, a local station ID code field and an end signal field. In the local station, an ID code allocated thereto and a count value indicating data reception/transmission address are preset. When coincidence is detected between the ID code sent from the central station and the ID code preset in the local station, the local station generates an end response. The frames sent out sequentially contain ID codes having values varying sequentially so as to identify the local stations, respectively. When no end response is detected, the central station can decide malfunction of the data signal line or units to be controlled/supervised of the local stations discriminatively on the basis of the ID codes.

10 Claims, 16 Drawing Sheets

FRAME STRUCTURE (EMBODIMENT 2)

ORDINARY FRAME (NON-EXTENSION MODE)

EXTENDED FRAME CONTAING EXTENSION CODE

FRAME CONTAINING ID CODE
SEIZING OPERATION

SEND-OUT OF ID CODE IN ORDINARY OPERATION

FRAME IN EXTENSION MODE

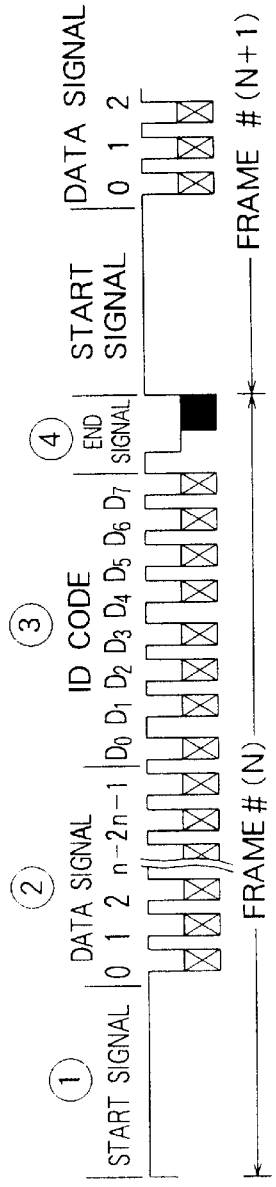
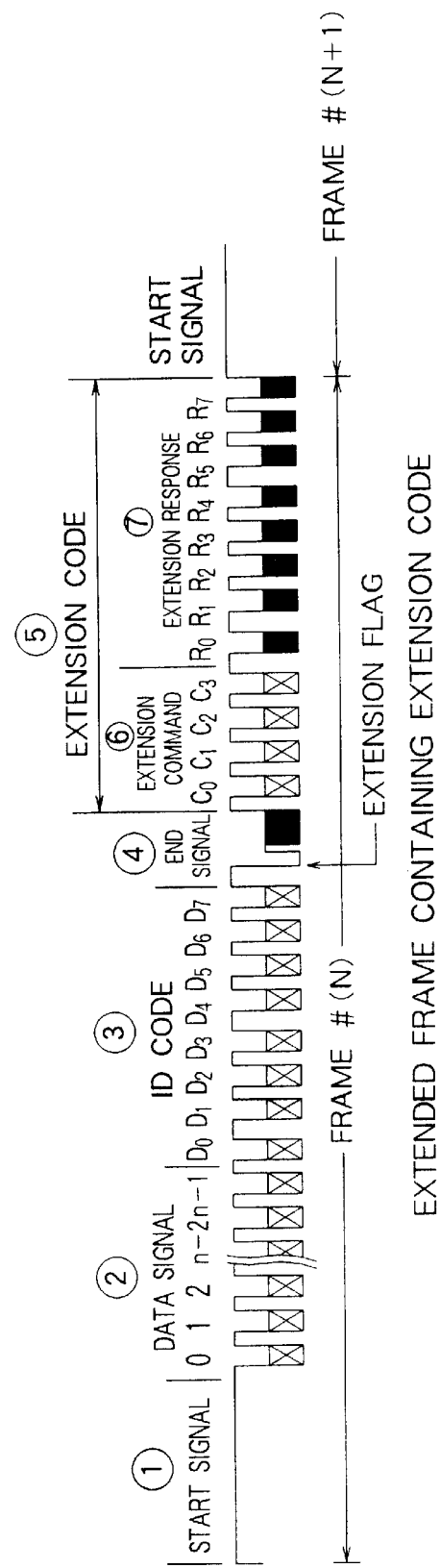
FIG. 3A — ORDINARY FRAME (NON-EXTENSION MODE)
FIG. 3B — EXTENDED FRAME CONTAINING EXTENSION CODE

FIG. 7   STRUCTURE OF LOCAL STATION (EMBODIMENT 1)

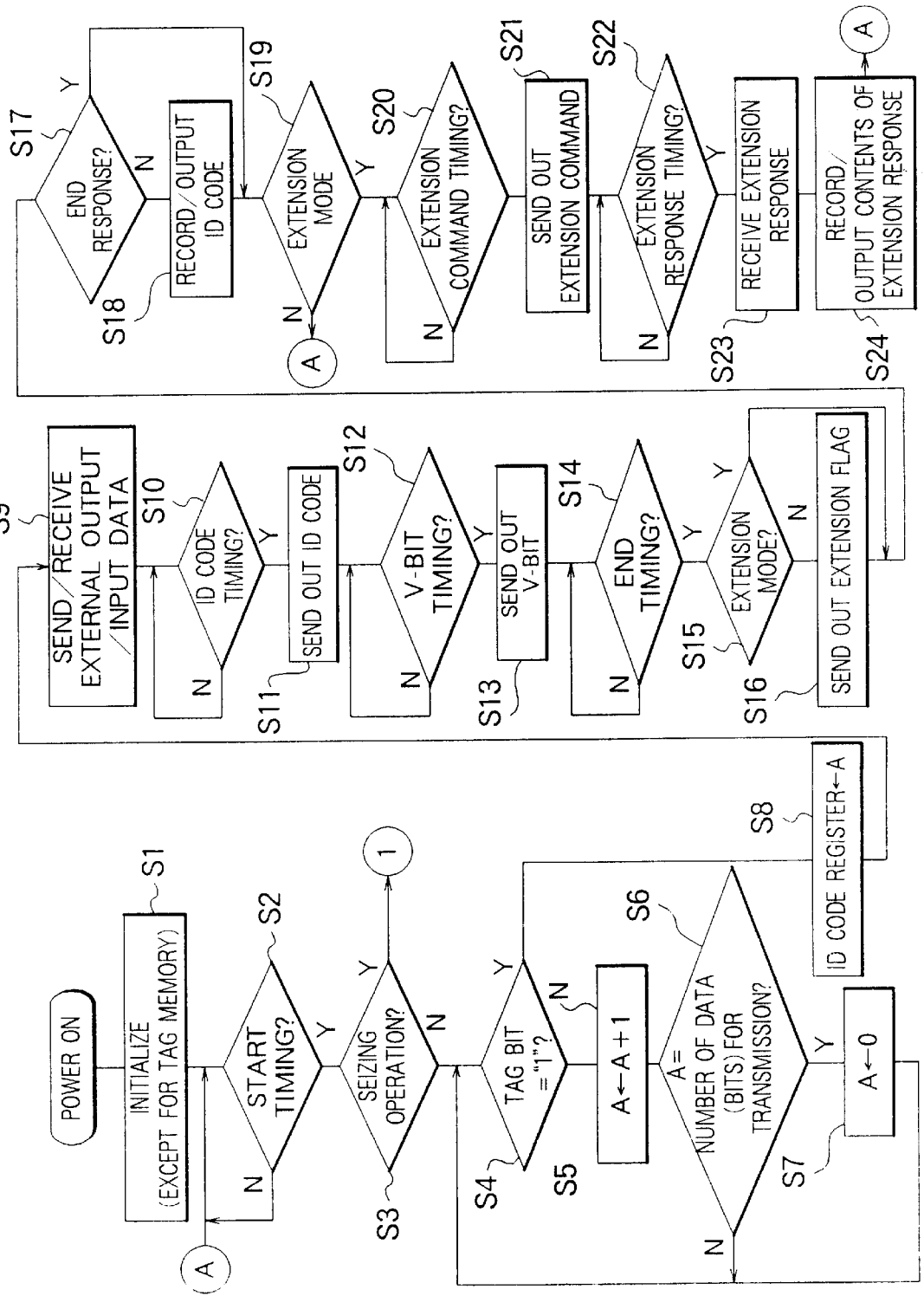
FIG. 12 OPERATION OF CENTRAL STATION (EMBODIMENT 2)

CONTROL/SUPERVISORY SIGNAL TRANSMISSION/RECEPTION SYSTEM

BACKGROUND OF THE INVENTION

1. Field of the Invention

The present invention generally relates to a control/supervisory signal transmission/reception system. More particularly, the invention is concerned with a control/supervisory signal transmission/reception system which includes a central station and a plurality of local stations which are installed at locations remote from the central station and connected thereto by way of a common transmission line or cable including a data signal line and which are provided with a plurality of instruments, devices or machines such as sensors, actuators, measuring devices, control devices, etc., to be controlled and monitored or supervised (hereinafter they are referred to collectively as the units to be controlled/supervised), wherein control signals generated in the central station are transmitted serially to the local stations for controlling and supervising the units to be controlled/supervised, while in the local station, supervisory signals indicating the various operating states of the units to be controlled/supervised inclusive of the local stations are generated to be serially transmitted to the central station by way of the common data signal line. In the central station, the supervisory signals undergo processing for detecting occurrence of fault or the like abnormality in the units to be controlled/supervised, the local station, and/or the transmission lines.

2. Description of Related Art

In recent years, automatically operated or controlled apparatuses, machines, instruments, plants, equipment and the like employed in various industrial fields have really made remarkable progress and they tend to be implemented on a larger and larger scale, requiring a greater number of devices used for the control purposes such as sensors, actuators or the like. In reality, the number of such devices increases to thousand or more per equipment. Consequently, the system which is in charge of controlling and monitoring or supervising such equipment has to cover an enormously large area, encountering increasingly a difficulty in detecting and coping with local abnormalities at earlier stage. Further, maintenance of such equipment relies primarily on exchange of devices which are open to doubt as to whether they really suffer abnormality or not in an effort to reduce the down time. Furthermore, such situations are frequently observed in which same abnormality makes appearance due to unavailability of the proper measures to be taken because of incapability of identifying the factor or cause giving rise to the abnormality.

Such being the circumstances, there exists a great demand for a system in which a central station can concentratively monitor or supervise abnormality suffering locations as well as abnormal states in local stations (terminals), units to be controlled/supervised and transmission cable so that even the person who are not skilled in the relevant art can take the measures for coping with the abnormalities.

As attempts for solving the problems mentioned above, there have been proposed several approaches disclosed in U.S. Pat. No. 4,937,568 filed on Aug. 26, 1988, issued Jun. 26, 1990 under the title "SIGNAL SERIAL/PARALLEL CONVERSION SYSTEM" and assigned to Kuroda Precision Industries, Ltd. and Nakamura Engineering Co., Ltd (corresponding to Japanese Patent Application No. 229978/1987), U.S. Pat. No. 5,223,826 filed on Jun. 1, 1990, issued Jun. 29, 1993 under the title "CONTROL/SUPERVISORY SIGNAL TRANSMISSION SYSTEM" and assigned to Nakamura Kiki Engineering, Co., Ltd. (corresponding to Japanese Patent Application No. 24724/1987), and U.S. Pat. No. 5,247,292 filed on Sep. 25, 1990, issued Sep. 21, 1993 under the title "SENSOR SIGNAL TRANSMISSION SYSTEM" and assigned to Nakamura Kiki Engineering, Co., Ltd. and Kuroda Precision Industries, Ltd (corresponding to Japanese Unexamined Patent Application Publication No. 6997/1991). Disclosures of these patents are incorporated herein by reference.

For having better understanding of the background of the present invention, description will first be made of the system proposed hereinbefore and disclosed in U.S. Pat. No. 5223,826.

FIG. 16 of the accompanying drawings is a block diagram for illustrating a basic structure of the control/supervisory signal transmission system disclosed in U.S. Pat. mentioned just above. Referring to FIG. 16, a reference numeral 90 denotes a controller, numeral 91 denotes a plurality of (e.g. n) first output units, numeral 92 denotes a plurality of (e.g. m) first input units, numeral 93 denotes a distributing unit, numeral 94 denotes a plurality of (e.g. m) second output units, numeral 95 denotes a plurality of (e.g. n) second input units, numeral 96 denotes a set of devices to be controlled, numeral 97 denotes a set of sensors, and numerals 98 and 99 denote terminating units, respectively. Further, reference character D designates a data (information) signal line, G designates a ground potential line, S designates a start signal line and P designates a power supply line. In the following, the first output unit 91 and the first input unit 92 will be referred to collectively as the first unit group for convenience of description. Similarly, the second output unit 94 and the second input unit 95 will be referred to as the second unit group.

The distributing unit 93 includes an oscillator (indicated by an abbreviation "OSC") 931, a timing generating means 932 for generating a clock signal and a start signal, a setting means 933 and a checking means 934.

The output signal of a clock oscillator ("OSC" for short) 931 constituting a part of the distributor 93 is applied to an input terminal of the timing generating means 932, whereby a clock signal cp having a predetermined frequency is generated and subsequently superposed on a power supply voltage level $V_x$, as illustrated only conceptually at (A) in FIG. 16, as a result of which a data voltage signal is produced which has a duty ratio of 50% and assumes the level $V_x$ during a first half of one period while assuming a level of $V_x/2$ (corresponding to data bits "0" and "1") during a second half. This data voltage signal is delivered from a terminal 93a onto the data signal line D. Further, a ground potential signal is outputted from a terminal 93b onto the ground potential line G. Further, in the case of the start line type control/supervise signal transmission system, a start signal is delivered onto the start signal line S or outputted onto the data signal line D in the form of a signal having a waveform different from that of the clock pulse signal.

Describing the basic operation, transmission of the control signal from the controller 90 to the controlled devices 96 as well as transmission of the supervisory (sensor) signals from the sensors 97 to the controller 90 through the transmission system is performed by modulating correspondingly the level of the clock pulse signal superposed on the power supply signal from the distributing unit 93 in accordance with the logic values of "1" (ON) and "0" (OFF) of the control signal and the supervisory signal at every corresponding clock pulse position. To this end, the distributing unit for generating a clock-pulse superposed power is provided in addition to the means for generating the start signal and the ground potential (earth) signal, wherein the first input unit and the first output unit are provided between the transmission line and the controller, while the second output unit is connected between the transmission line and the controlled devices with the second input unit being provided between the transmission line and the sensors.

Outlining the operation of the system as a whole, there is previously set or placed in the setting means 933 of the distributing unit 93 a numerical value representing the number of data to be transmitted during one transmission period (each corresponding to one clock). When the start signal is generated simultaneously with the outputting of the data signal from the distributing unit 93, the first input unit 92 to which parallel control signals are inputted from the controller 90 through the input/output (I/O) unit 902 selects the leading one of the plural input signals and sends it out onto the data signal line D in the form of the correspondingly modulated voltage level.

The signal on the data signal line D is extracted by the second output unit 94 selected by the start signal, whereby the output corresponding to logic "1" or "0" is generated to be held in the second output unit 94 and at the same time supplied to the set of controlled devices (units to be controlled/supervised) 96 to allow the corresponding one of them (not shown) to be driven when the output is logic "1" or alternatively stop operation of that one device when the output is logic "0". Similar operation is performed sequentially in response to the other control signals transmitted from the first input unit 92, respectively, whereby the control signals are applied to the other corresponding output terminals of the second output unit 94, respectively, to be held thereby. It can thus be seen that the input terminals of the first input unit 12 bear one-to-one correspondence with the output terminals of the second output unit 94. Accordingly, the number of the input terminals of the former is equal to that of the output terminals of the latter. Subsequently, the second input units 95 to which the supervisory signals are inputted in parallel from the sensors 97 and at the same time the first output unit 91 are driven to thereby send the supervisory signal (sensor output signal) in the direction opposite to that in which control signals mentioned hereinbefore are sent.

As the scheme for controlling the operation timing of the individual input and output units, there may be mentioned a start signal scheme according to which the start signals are sequentially generated for each of the units connected in series, and an address count scheme according to which all the start signals of a specific pattern on the data signal line are detected by all the units, wherein when the count value of the data signal coincides with a value preset for each of the units, then the unit receives the signal as the control signal from the data signal line at that time point or modulates that signal to thereby send the modulated signal as the supervisory signal.

When the transmission of the control signals and the supervisory signals between the associated input and output units (92, 94; 95, 91) have been completed, a number of the trailing clock pulses are supplied to the check means 934 from the timing generating means 932. The check means 934 discriminatively identifies or checks the signal states of the data signal line D for every clock pulses to thereby check the states concerning a plurality of items.

Then, at a time point corresponding to a clock (p+1) succeeding to the clock p, the start signal is generated from the last or final unit (in the case of the start signal scheme mentioned above). By checking this start signal, it is determined whether or not the data signal is transmitted to the last unit. In this manner, it is possible to detect a fault such as breakage of the transmission cable up to the terminal end thereof.

Next, at a time point corresponding to a succeeding clock (p+2), the signal voltage level $V_x/2$ (logic "0") is generated to be outputted onto the data signal line. At the same time, the signal voltage level on the data signal line is detected by the check means. When the voltage level of $V_x/2$ is detected, it is then determined that the transmission line or cable is normal. However, when a voltage lower than $V_x/2$ (logic "1") is detected, this means that the transmission cable suffers external disturbance such as noise, short-circuits between the wires or the like unwanted event. This check is referred to as "data="0" check".

Furthermore, at a next timing (p+3), the ground potential level (logic "1") is generated on the data signal line. At the same time, the signal voltage on the data signal line is detected by the check means. When the signal voltage corresponds to the logic "0" level (higher than $V_x/2$), then it is determined that the transmission cable suffers external disturbance such as noise, short-circuit or the like. This check is referred to as "data="1" check".

Finally, at a timing (p+4), the check means checks whether or not the terminating unit 99 or 98 provided additionally to the final stage units in the start signal system generates a signal indicative of termination. Unless the above signal is detected, it is then decided that fault such as breakage, sort-circuit or the like abnormal event takes place in the transmission cable.

The signal transmission system proposed previously and shown in FIG. 16 of the accompanying drawings is certainly imparted with the abnormality supervising function such as the termination check, the data="0" check and the data="1" check. However, the system suffers problems mentioned below.

(1) Because the location at which abnormality occurs can not be specified with the checks mentioned above, a so-called field inspection has to be performed by dispatching an engineer in charge of maintenance to the locations where the transmission cable and the individual units are installed.

(2) When the transmission path is branched, it is impossible with the distributing unit to detect any fault of the branched transmission cables.

(3) It is impossible with the distributing unit or the controller to detect whether or not the devices or units to be controlled and the sensors (i.e., units to be controlled/supervised) operate normally.

(4) When the number of the local stations connected to the system is increased or decreased, difficulty is encountered in grasping discriminatively or identifying accurately the system configuration inclusive of the number of the local stations connected to the system at the central station.

SUMMARY OF THE INVENTION

In the light of the state of the art described above, it is an object of the present invention to provide a control/supervisory signal transmission/reception system which makes it possible to discriminatively identify abnormality suffering parts, units or locations with high reliability at a main or central station.

Another object of the present invention is to provide a control/supervisory signal transmission/reception system which is imparted with capability for supervising and detecting at the central station the breakage of a transmission cable or line even in branched portions thereof.

Yet another object of the present invention is to provide a control/supervisory signal transmission/reception system which makes it possible to supervise or monitor discriminatively the states of units to be controlled/supervised inclusive of sensor devices at the central station.

A further object of the present invention is to provide a control/supervisory signal transmission/reception system which incorporates facility for confirming identifiers (IDs) allocated, respectively, to a plurality of local stations connected to the main or central station via the transmission cable.

In view of the above and other objects which will become apparent as the description proceeds, the present invention is directed to a control/supervisory signal transmission/reception system for controlling and supervising operations and operating states of a plurality of units to be controlled and supervised. The system includes a central station and a plurality of local stations which are interconnected by way of a common data signal line. The units to be controlled/supervised are operatively connected to the local stations, respectively, to be controlled and supervised through the central station. The central station includes a signal generating means for generating a voltage signal containing a series of pulse-like signals, wherein the pulse-like signals contain those having a first voltage level ($V_x$) of a first predetermined duration for representing non-data state (i.e., state indicating no data) and those having a second voltage level ($V_x/2$) corresponding substantially to a half of the first voltage level ($V_x$) and having a second predetermined duration for representing a data state, a clock means for generating a clock signal for controlling a timing at which the pulse-like signals are generated in the central station, wherein data to be sent from the central station to the local stations, data to be sent from the local station to the central station and data to be sent from a given one of the local stations to another local station are transmitted at the second voltage level ($V_x/2$) and a ground potential level (zero volt).

In the control/supervisory signal transmission/reception system mentioned above, it is proposed according to a general aspect of the present invention to provide in the central station a frame transmitting means for sending out sequentially and repetitively ordinary frames each of which contains a start signal having a first constant duration transmitted at the first voltage level ($V_x$), a data signal containing a plurality of voltage pulses which can selectively assume combinations of the first voltage level ($V_x$) and one of the second voltage level and the ground potential level in correspondence to data to be transmitted from the central station to the local stations, an identifier signal representing an identifier code of each of the local stations and an end signal having a waveform differing from that of the data signal, wherein the identifier code has information for identifying each of the local stations. On the other hand, each of the plural local stations includes an identifying number setting means for setting an own identifying number assigned previously to each of the local stations, an address setting means for setting a count value indicating an own address of the local station for enabling reception and transmission of the data signal, a data receiving/sending means responding to reception of the frame for fetching a predetermined number of the voltage pulses contained in the data signal, the predetermined number being determined on the basis of the count value indicating the address assigned to the local station, an identifier code extracting means for extracting the identifier code contained in the frame and received by the local station in precedence to the end signal, a comparison means for comparing the extracted identifier code with the own identifying number of the local station, and an end response means responding to coincidence between the identifier code and the own identifying number assigned to the local station for thereby sending a response to the central station by modulating the level of the end signal which level represents the data state.

In a preferred mode for carrying out the invention, the central station may further include a storage means for storing information concerning connection status of the local stations in correspondence to all of the identifier codes which are useable, respectively. The central station sends out onto the data signal line a plurality of ordinary frames in succession in precedence to starting of the control/supervisory operation or alternatively in the course of the control/supervisory operation. Each of the ordinary frames is constituted by a start signal field, a data signal field, an identifier code field and an end signal filed, wherein the identifier code field contains the local station identifier code which serves for identifying the local station for which the frame containing that local station identifier code is destined. The plurality of frames contain, respectively, the local station identifier codes having values which vary sequentially from an initial value to a last value useable. Upon detection of coincidence between the local station identifier code contained in the frame as extracted from the data signal line and the own identifying number in each of the local stations, the end response means incorporated in the local station modulates correspondingly the signal level contained in the end signal field and representing the data state to thereby issue an end response signal. The central station identifies discriminatively the end response signal corresponding to the identifier code to thereby write information indicating the response in the storage means at a location corresponding to identifier code. The central station sends out sequentially the frames having the identifier codes containing the information representing the connection status, as mentioned above, to thereby monitor presence or absence of the end responses from the local stations, respectively.

In another preferred mode for carrying out the invention, the central station may further include an extended frame transmitting means for sending out sequentially extended frames in an extension mode of operation for detecting states of the units to be controlled/supervised connected to the local stations, respectively, wherein each of the extended frames may be composed of the start signal, the data signal, the identifier code, an end signal having a waveform differing from that of the end signal contained in the ordinary frame, and an extension code containing a plurality of bits and inserted in succession to the end signal. The extension code contains a command signal issued by the central station to the local station and a response signal issued by the local station to the central station for messaging states of the units to be controlled/supervised monitored by the local station to the central station. On the other hand, each of the local stations include a means for identifying the extended frames discriminatively and a command identifying means for identifying the command signal contained in the extension code, and a sending means for sending to the central station information concerning states of the units to be controlled/supervised upon detection of coincidence of the identifier code by modulating the response signal with the information. The central station identifies discriminatively the response signals corresponding to the identifier codes and contained in the extended frames, respectively, to thereby supervise the local stations and the units to be controlled/supervised as to occurrence of abnormality.

In yet another preferred mode for carrying out the invention, the ordinary frame may contain additionally a validity bit (V-bit) indicating whether data represented by the data signal contained in the ordinary or extended frame is valid or not, wherein the validity bit is inserted between the identifier code and the end signal. Each of the local stations may further include a detecting means for detecting the validity bit, a temporarily holding means for temporarily holding received data of plural bits at a timing for reception, and an output register means for outputting the data held by the temporarily holding means to the units to be controlled/supervised provided in association with the local station, wherein the data held by the temporarily holding means is loaded in the output register means in response to the output of the validity bit detecting means indicative of validity of the data.

In a further preferred mode for carrying out the invention, the central station may further include an extended frame transmitting means for sending out sequentially a plurality of extended frames onto the data signal line in an extension mode for detecting states of the units to be controlled/supervised connected to the local stations, respectively, wherein each of the extended frames is composed of the start signal, the data signal, the identifier code, an end signal having a waveform differing from that of the end signal of the ordinary frame, and an extension code containing a plurality of bits and inserted in succession to the end signal, wherein the identifier codes of the extended frames have values varying sequentially from an initial value to a last value usable. The extension code may contain a command signal issued by the central station to the local station and a response signal issued by the local station to the central station for messaging states of the units to be controlled/supervised monitored by the local station to the central station. Upon detection of coincidence between the identifier code and the own identifying number upon reception of the extended frame, each of the local stations modulates the response signal contained in the extended frame as received with a signal indicative of type information of the local station and the modulated response signal is sent to the central station. The central station includes a storage means for storing the type information of the local stations in correspondence to the identifier codes thereof, respectively, so that the information represented by the modulated response signals can be stored in the storage means in correspondence to the identifier codes, respectively.

Further, in the control/supervisory signal transmission/reception system, the central station may so implemented as to send out the ordinary frames sequentially in accordance with the identifier codes of the local stations, respectively. In that case, in each of the local stations, operation of the end response means for generating the response signal to the central station is disabled when abnormality is detected in that local station at a time point when response is to be issued by the end response means upon detection of coincidence between the identifier code and the own identifying number. When the central station receives no end response from the local station corresponding to the identifier code, the ordinary frame mode can be changed over to an extension mode in which extended frames are sequentially sent to the local stations, respectively. In that case, each of the extended frames may be composed of the start signal, the data signal, the identifier code, an end signal having a waveform differing from that of the end signal of the ordinary frame, and an extension code containing a plurality of bits and inserted in succession to the end signal, wherein the extension code may contain a command signal issued by the central station to the local station and a response signal issued by the local station to the central station for messaging states of the units to be controlled/supervised monitored by the local station to the central station.

By virtue of the above-mentioned arrangements of the control/supervisory signal transmission/reception system according to the invention in which the central station and a large number of local stations are so interconnected by the transmission line as to carry out transmission and reception of data signals between the central station and the local stations via the common data signal line included in the transmission line or cable and adapted to carry the three-level signals, it is possible to confirm or obtain the information concerning the structures or functions of the local stations connected to the system by using the frames having ID codes differing from one to another frame. This operation is referred to as the seizing operation.

Furthermore, in the course of transferring the data signals with the local stations by using the ordinary frames, it is possible for the central station to check occurrence of fault such as breakage of the transmission line or shut-down of the local station(s) or the unit to be controlled/supervised the function for generating the end responses upon every detection of coincidence of the identifier code. Furthermore, when a fault or abnormality takes place, a fault suffering location such as the transmission line or local station can easily be identified with the aid of the identifier code.

On the other hand, in the extension operation mode, the central station can send commands to the local stations by using the extended frames to thereby allow the local stations to send back to the central station the signal indicating states such as normal or abnormal states of the units to be controlled/supervised connected to the local station. Thus, the internal states of the local stations inclusive of the units to be controlled/supervised can be identified or determined discriminatively at the central station without need for dispatching the person in charge of maintenance to the field where the local station is installed.

Furthermore, by providing the validity bit (V-bit), the data signal can selectively be validated or invalidated in dependence on the degree of the external disturbance to which the data signal are subjected during transmission along the data signal line constituting a part of the transmission line. Thus, enhanced reliability can be ensured for the operation of the control/supervisory signal transmission/reception system.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which:

FIG. 3A is a view for illustrating a structure of a frame employed in an ordinary operation mode of the control/supervisory signal transmission/reception system according to a first embodiment of the present invention;

FIG. 3B is a view for illustrating a structure of an extended frame employed in an extension mode in the control/supervisory signal transmission/reception system according to the first embodiment of the invention;

FIG. 12 shows in combination with FIG. 13 a flow chart for illustrating processing operations executed by a central station in the control/supervisory signal transmission/reception system according to the second embodiment of the invention;

DESCRIPTION OF THE PREFERRED EMBODIMENTS

Figure 1:
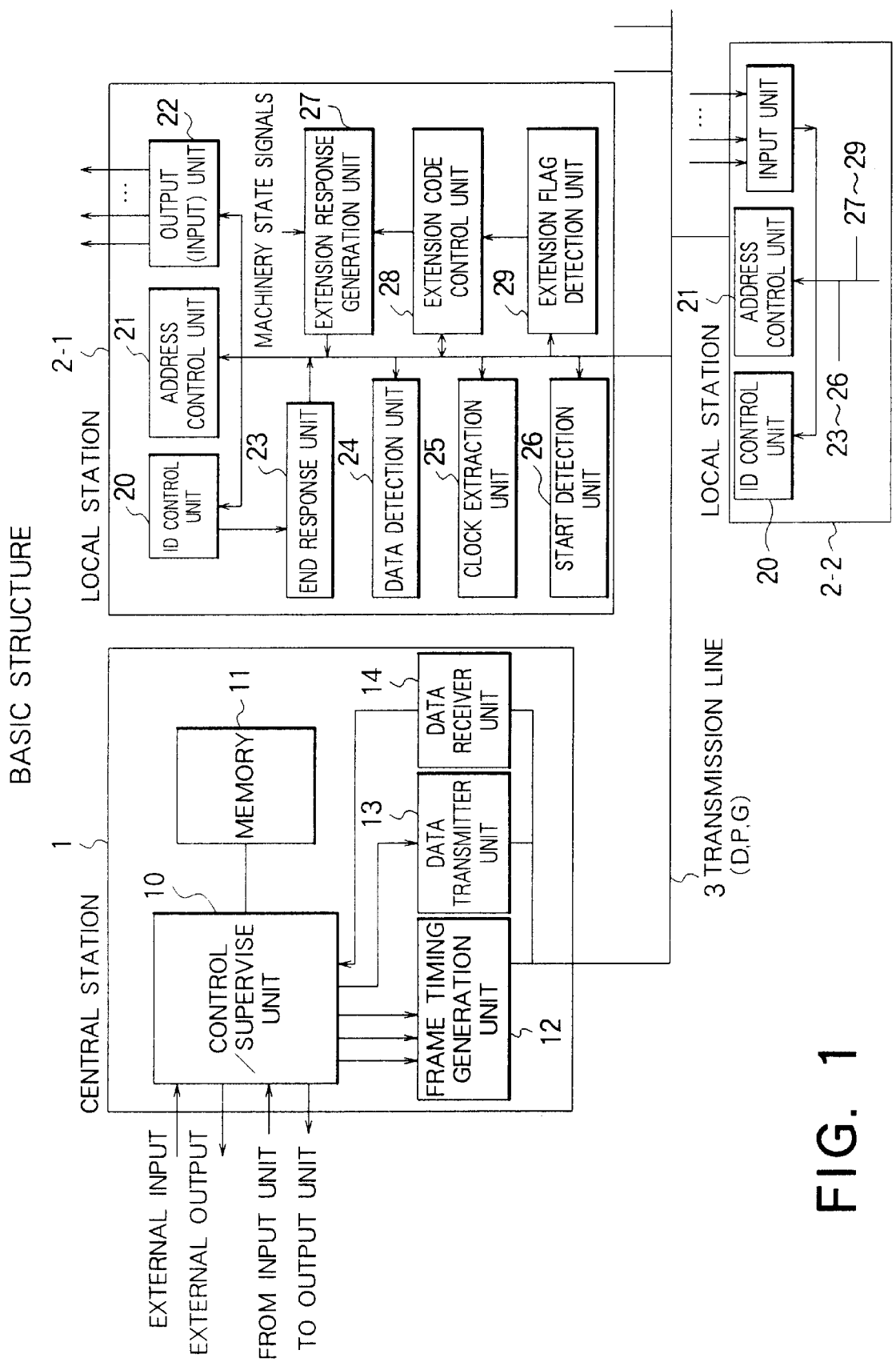
FIG. 1 is a block diagram showing generally a basic structure of a control/supervisory signal transmission/reception system according to the present invention.

Now, the present invention will be described in detail in conjunction with what is presently considered as preferred or typical embodiments thereof by reference to the drawings. In the following description, like reference characters designate like or corresponding parts throughout the several views.

General Description

Before entering into detailed description of the control/supervisory signal transmission/reception system according to the present invention, description will first be made of the basic concept underlying the invention.

FIG. 1 is a block diagram showing generally a basic structure or arrangement of the control/supervisory signal transmission/reception system according to the invention. In the figure, reference numeral 1 denotes a central station to which local stations 2-1, 2-2, . . . are connected by way of a transmission line or cable 3 which is composed of a data signal line D, a ground potential line or an earth line G and a power supply line P. In the case of a system in which a so-called start signal line scheme is adopted, the transmission cable 3 includes additionally a start signal line, although not shown. At this juncture, it should also be mentioned that in a control/supervisory signal transmission/reception system in which the number of the local stations as installed is small, the power supply line P may be spared. In that case, the electric power demanded for driving or operating the local stations may be derived from the data signal line D, as disclosed in U.S. Pats. mentioned hereinbefore.

The central station 1 includes a control/supervise circuit 10 which is in charge of controlling operations of the control/supervisory signal transmission/reception system on the whole and additionally serves for supervision for the purpose of maintenance of the system. To this end, the control/supervise circuit 10 is provided with not only input terminals for receiving input signals or data supplied externally and output terminals for outputting signals to external devices or apparatuses but also a terminal or terminals for input signals which are utilized for maintenance of the system and a terminal for the output signals to be utilized in a display unit and/or a controller. Further, the central station 1 includes a memory 11, a frame timing generation unit 12, a data transmitter unit 13 for transmitting or sending data to the local stations and a data receiver unit 14 for receiving data from the local stations. In the case of the control/supervise system shown in FIG. 1, the local station 2-1 is designed for outputting data to an actuator(s) or device(s), machine(s) or the like to be controlled (hereinafter referred to correctively as the units to be controlled/supervised), whereas the local station 2-2 is designed for receiving data from sensors or the like devices provided in association with the local station. These sensors and the like are also referred to collectively as the units to be controlled/supervised. Although only two local stations are illustrated in FIG. 1, it goes without saying that any further local stations serving for the function for data outputting and data fetching or local stations designed to serve for both the functions may be provided. As can be seen in the figure, the local station 2-1 is composed of an ID control unit 20, an address control unit 21, an output unit 22, an end response unit 23, a data detection unit 24, a clock extraction unit 25, a start detection unit 26, an extension response generation unit 27, an extension code control unit 28 and an extension flag detection unit 29. The local station 2-2 is also implemented in a same configuration as the local station 2-1 except that the output unit 22 is replaced by an input unit for fetching data or information, because the local station 2-2 is assumed to serve for collecting the information concerning the units to be controlled/supervised. Of course, the output unit 22 of the local station 2-1 may be so designed as to serve not only for outputting data signal but also receiving input signal from the units to be controlled/supervised.

At this juncture, it should be mentioned that although a plurality of local stations 2-1, 2-2, . . . and so forth (hereinafter referred to as the local station 2 representatively) are illustrated as being connected directly to the central station 1 by way of the data signal line D, the ground potential line G and the power supply line P represented en bloc by the transmission line 3, the local stations may equally be connected to lines branched from these lines D, G and P.

In the control/supervisory signal transmission/reception system according to the present invention, the transmission line or cable 3 is constituted by the data signal line D, the ground potential line G and the power supply line P as in the case of the supervisory control signal transmission system disclosed in U.S. Pat. No. 5,223,826 (corresponding to Japanese Unexamined Patent Application Publications No. 140826/1989 (JP-A-1-140826)) cited hereinbefore, wherein data signals including control signals and supervisory signals are transferred between the central station and the local stations via the data signal line D in the form of a serial-pulse signal which can assume three levels.

More specifically, in the control/supervisory signal transmission/reception system according to the present invention, a three-level signal similar to that disclosed in U.S. Patent specification mentioned above is made use of, wherein the three-level signal may assume a first level $V_x$ indicating a non-data state (i.e., state representing no data), a second level $V_x/2$ indicating a data-off state (logic "0" state) and a third level of zero volt indicating a data-on state (logic "1" state). Each of one-bit pulses constituting the data signal and an identifier signal or ID signal described hereinafter and generated in synchronism with a clock signal is composed of a first half having the first level indicating the non-data state and a second half indicating the data state (i.e., data-off or logic "0" state or data-on or logic "1" state), respectively.

In the control/supervisory signal transmission/reception system according to the present invention, not only the control signal and the supervisory signal but also a specific frame containing information concerning the structure of the local station connected to the transmission line 3 are transferred between the central station and the local stations via the transmission line 3. Additionally, a frame containing information concerning operation state of the local station is sent to the central station via the transmission line 3 in response to a request issued by the central station onto the transmission line 3.

Now, operation of the control/supervisory signal transmission/reception system will be described briefly. In each of the local stations 2, a local station identifying code (hereinafter referred to also as the ID code) is previously set at the ID control unit 20, while an address of the local station is set at the address control unit 21. In that case, addresses allocated to the local stations, respectively, are determined by the sequential or ordinal positions of the data signals which are processed by the local stations, respectively, and transmitted via the data signal line D, being superposed on the clock signal, as counted from the start signal. By way of example, the local station for which the data signal in the form of a first pulse train as counted from the start signal is destined is allocated with the address corresponding to, e.g. "1", while the local station which is destined to process a data signal in the form of a second pulse train as counted from the start signal is allocated with an address corresponding to, e.g. "2" and so forth. In this conjunction, it is to be noted that the ID code of each local station may be allocated with a value which differs from the address assigned thereto. However, for convenience of description, it is assumed that the ID code and the address of any given one of the local stations are same. Of course, the invention is never restricted to such allocation of the ID codes and the addresses as mentioned above. It goes without saying that other types of ID code/address allocation schemes may be adopted in dependence on the system configuration as well as applications for which the control/supervisory signal transmission/reception system is intended.

Figure 2A:
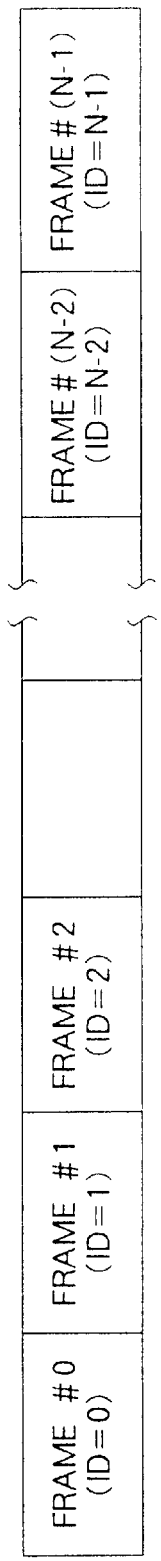
FIG. 2A is a view for illustrating a format of a frame signal containing ID codes issued by a central station in seizing operation for seizing operation states of local stations.

In the control/supervisory signal transmission/reception system according to the present invention, a so-called seizing operation is performed when configurations or structures of all the local stations connected to the transmission line 3 and put into operation are to be grasped or seized en bloc by the central station. FIG. 2A shows a format of a signal containing the ID codes issued by the central station for seizing the operation states of the local stations, wherein each value of the ID code is set in each of the seizing frames. As can be seen in the figure, the signal contains frames #0, #1, . . . , #(N−1), which coincide with the ID codes of the local stations, respectively. In this manner, N frames corresponding to the ID codes #1 to #(N−1) are serially or sequentially sent out onto the transmission line 3 from the frame timing generation unit 12 of the central station. In each of the local stations 2, the start of the frame sequence is detected by the start detection unit 26 with the clock signal being extracted by the clock extraction unit 25. Further, the ID control unit 20 compares the ID code detected by the data detection unit 24 with the ID code assigned to the local station to which the ID control unit 20 belongs. When coincidence is found between the ID code detected and that of the relevant local station, the end response unit 23 changes the $V_x/2$-level of an end signal (not shown in FIGS. 2A to 2C) located at the trailing end of the frame to "1" to thereby issue an end response which is then sent out onto the data signal line D.

On the other hand, in the central station 1, the data receiver unit 14 identifies discriminatively the voltage levels of the end responses for the individual frames corresponding to the ID codes, respectively, whereon the response information is written in the memory 11 in correspondence each of the ID codes. More specifically, there are stored in the memory 11 the bits "1" for the ID codes corresponding to the frames #0, . . . , and/or #(N−1) for which the local stations made response, while bits "0" are written in the memory 11 for the ID codes of the local stations which made no response to the frames mentioned above. In this conjunction, the bits mentioned above will hereinafter be referred to as the tag bits.

Figure 2B:
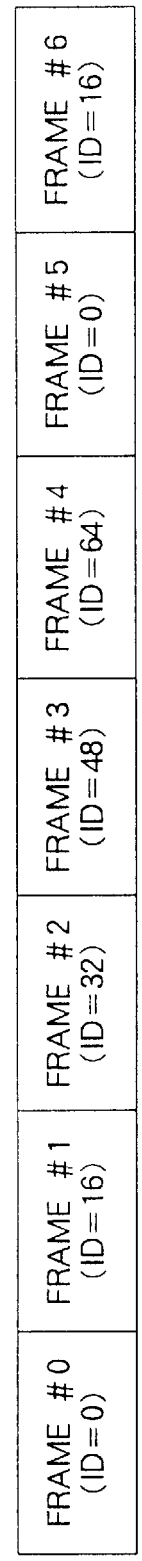
FIG. 2B is a view for illustrating a format of a frame signal in an ordinary operation.

In the ordinary operation, the frames (i.e., ordinary frames for the non-extension mode of operation) each containing the data signal, the ID code corresponding to the destination local station and the end signal are sent to those local stations having the ID codes for which the tag bits have been "1" in response to the end signals, as is illustrated in FIG. 2B. Parenthetically, there are shown in this figure only the ID codes contained in the frames. In the case of the example illustrated in FIG. 2B, the frame #0 to #4 of the ID="0", ID="16", ID="32", ID="48" and ID="64" are sent respectively. Upon reception of the frame in each of the local stations 2, the address control unit 21 determines the address of the local station to which the address control unit 21 belongs by counting the clock pulses extracted from the data signal contained in the relevant frame to thereby compare the address as determined with the preset address and at the same time, it is decided by the ID control unit 20 whether or not the preset ID code has been received.

When the coincidence of the address is decided, a number of pulse signals allocated to the local station now of concern is supplied to the output unit 22 in which the pulse signals undergo serial-to-parallel conversion to be outputted to the external units to be controlled/supervised. This operation is performed by the local station 2-1 destined for output operation (i.e., the local station serving as the output terminal). In the case of the local station destined for input operation (i.e., in the local station serving as the input terminal) as designated by reference numeral 2-2 in FIG. 1, parallel signals are inputted to the input unit 22 from the associated sensors or the like to be converted into a serial signal which is then outputted onto the data signal line D. In this manner, the central station 1 responds to the input of a control data signal supplied from an external control signal source to thereby send a signal modulated with the control data signal to the local station 2-1 serving as the output terminal. On the other hand, the local station 2-2 serving as the input terminal sends a data signal resulting from modulation with an external signal such as sensor output signal to the central station 1. Upon completion of the transfer of data signals between the central station and the local station as described above, the local station having the ID code for which coincidence is detected sends back an end signal to the central station.

Figure 2C:
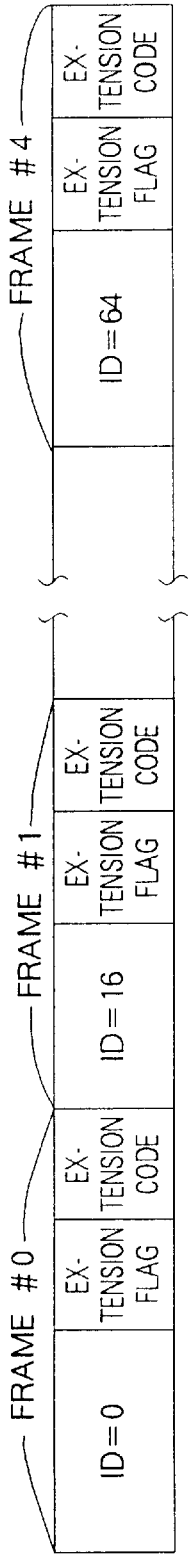
FIG. 2C is a view for illustrating a format of a frame signal used in operation of extension mode.

When abnormality in the transmission line and/or the local station is to be discriminatively detected by the central station, the latter sends out a frame of extension mode (extended frame). A basic structure of the frame of extension mode is illustrated in FIG. 2C. As can be seen in the figure, the extended frame for the extension mode of operation corresponds to the ordinary frame except that an extension flag of a unique waveform indicating extension of the corresponding frame for the local stations is added in succession to the identifier and that an extension code is added in succession to the extension flag. Each of the extension codes contains information concerning types of command for the local station and a code for setting the content of response from the local station.

In each of the local stations 2, the extension flag is detected by the extension flag detection unit 29 upon coincidence of the own ID code of the local station with the ID of the frame received after data transfer with the central station. Subsequently, the extension code control unit 28 is driven to determine discriminatively the command contained in the extension code, whereupon the extension response generation unit 27 is activated to output an extension response containing information indicated by the command mentioned above (i.e., information indicating operation state(s) connected to the local station or associated information thereof). The response is then placed in the frame. On the other hand, when the response information corresponding to the command of the extension code is received by the central station 1, the information is stored in the memory 11 and/or outputted to an external unit or device such as display unit to generate a corresponding message to a person who is in charge of maintenance.

In the seizing operation mode described hereinbefore, the non-extended frame is employed. It should however be mentioned that the extended frame can be employed in the seizing operation as well. In that case, the central station can fetch to record or store the information concerning the types of the local stations (such as the input terminal, output terminal, input/output terminal, number of data and the like) in terms of the extension response information. Thus, maintenance feature of the control/supervisory signal transmission/reception system can be much enhanced.

Although it has been described that the extension mode is set up by the central station, such system arrangement may equally be adopted that when no end response is issued from a local station in the ordinary or normal operation mode (i.e., in the non-extension mode), the mode is changed over to the extension mode. In that case, the local station may stop the end response upon occurrence of abnormality in the local station, to thereby request the central station to change the operation mode to the extension mode.

Embodiment 1

FIGS. 3A and 3B are views for illustrating in combination frame structures employed in the control/supervisory signal transmission/reception system according to a first embodiment of the present invention, wherein FIG. 3A shows a normal or ordinary frame (frame for non-extension mode) and FIG. 3B shows an extended frame containing an extension code.

The ordinary frame shown in FIG. 3A is employed for transmission/reception of the control signal and the supervisory signal between the central station and the local station(s). Further, the frame of the structure shown in FIG. 3A is employed when the central station performs the seizing operation. Namely, by using the frame structure shown in FIG. 3A in the seizing operation, transfer of the data signal can be carried out.

In the control/supervisory signal transmission/reception system according to the first embodiment of the invention, a number of frames equal to that of the local stations are generated in a one-to-one correspondence relation to the local stations, respectively, wherein each of the frames is comprised of four signals ① to ④, as illustrated in FIG. 3A in conjunction with the N-th frame (i.e., frame #N).

The signal ① is used as a start signal for indicating discriminatively the leading end of each frame. In the case of the exemplary frame structure illustrated in FIG. 3A, the start signal is of a length corresponding to five bits and allocated with the first level, e.g. 24 volts.

The signal ② represents the data signal which is constituted by n data bits 0 to (n−1) generated in synchronism with the clock pulses in correspondence to n input/output points, respectively.

The signal ③ serves as the ID code (local station identifying signal). In the case of the instant embodiment of the invention, the ID code is constituted by 8 bits $D_0$ to $D_7$ so that 256 local stations #0 to #255 can be discriminatively identified. Of course, by increasing the number of bits constituting the ID code, more than 256 local stations can be discriminated from one to another.

The signal ④ is employed as the end signal. In the non-extension mode (i.e., the mode in which no extension code is employed), the central station sends out the end signal ④ which has the first level (i.e., $V_x$=24 volts) during a period corresponding to 0.5 bit length and the second level (i.e., $V_x/2$=12 volts) during a period corresponding to 1.5 bits length in succession to the first level. On the other hand, when the local station identified by the ID contained in the same frame detects data state or level of a duration exceeding a time period corresponding to 0.75 bit, the second half of the duration of the data level is set to ON level (e.g. zero volt). This ON setting operation performed by the local station is referred to as the end response, while a combination of the non-data state (or level) and the data state (or level) is referred to as the end signal. In FIG. 3A, pulse duration indicated by a solid rectangle in black (square bullet) represents the end response.

FIG. 3B shows a structure of the extended frame employed in the control/supervisory signal transmission/reception system according to the first embodiment of the present invention for the purpose of allowing the central station to get information concerning operation state of the local station of concern inclusive of the associated units to be controlled/supervised or for allowing the central station to supply attribute information to the local station of concern in the form of the extension command in order to obtain the corresponding information from the local station. The extended frame is constituted by the signals ①, ② and ③ described above in conjunction with the ordinary frame and signals ④ and ⑤ in respect to which the extended frame differs from the ordinary frame. Accordingly, only the signals ④ and ⑤ will be elucidated below.

The signal ④ represents the end signal in the extension mode. This end signal assumes the first level (24 volts) during a period corresponding to 0.5 bit length, a third level (zero bolt) during a succeeding 0.5-bit period and the second level (12 volts) in this sequence. In succession to this end signal, bits for the succeeding extension code are generated. At this juncture, it should be added that the third level of 0.5-bit length (i.e., the zero-volt level) is provided for the purpose of discriminating between the ordinary frame and the extended frame from each other and referred to as the extension flag.

In the local station identified with the ID code, the data state of a duration exceeding a time corresponding to a 0.75-bit length is detected, whereon the end response is sent back to the central station in the second half of the duration of the data state or level.

The signal ⑤ represents an extension code which is interposed between the end signal containing the extension flag and the start signal of the succeeding frame. As can be seen in FIG. 3B, the extension code includes two fields, i.e., fields ⑥ and ⑦ for the extension command and the extension response, respectively.

The extension command ⑥ is constituted by four bits $C_0$ to $C_3$, and used by the central station for commanding the local station(s). As the contents of the extension command, the following may be mentioned.

(a) command for requesting information concerning respective internal state common to the terminals (i.e., the local stations), (b) command for requesting information concerning internal states of individual terminals (i.e., the local stations), (c) command for requesting succeeding information concerning internal states of the individual terminals (i.e., the local stations), (d) command for resetting hold state internally of the terminal, (e) command for changing over or setting of operation mode of the terminal, and (f) command for inquiring the terminal of the types thereof (structure, function, number of inputs/outputs and the like).

On the other hand, the extension response ⑦ is composed of 8 bits $R_0$ to $R_7$ and represents the contents of response sent back from the local station to the central station. In FIG. 3B, these responses are indicated by solid rectangles in black, respectively.

As the contents of the extension responses, the following may be mentioned, by way of example.

(i) As the response to the aforementioned command (a) (i.e., command for requesting information concerning internal state common to the local stations,
  local abnormality occurring in the local station, abnormal lowering of the power supply voltage, abnormality of common voltage levels, abnormality of pressure level of hydraulic/aerodynamic machinery and data holding state internally of the local station.

(ii) As the response to the commands (b) and (c) (i.e., command for requesting information concerning respective internal states of individual local stations,
  information of overcurrent/overload, breakage of lead wires of sensor(s), simultaneous ON-states of outputs of Exclusive-OR device, absence of output/response of the units to be controlled/supervised, information concerning circuit function (input or output function) and busy or idle state of input or output circuit.

(iii) As the response to the command (d) and (e) (i.e., command for resetting hold state internally of the terminal, and command for changing over or setting of operation mode of the local station),
  relevant information concerning responsive operations such as resetting, change-over or switching, setting or the like.

(iv) As the response to the command (f),
  information concerning the types of the terminal or local station in respect to the structure, function, the number of inputs/outputs or the like.

In this way, when a given one of the local stations detects any abnormality in response to the command issued by the central station, it is possible for the local station to send the information concerning abnormal state as detected in the form of the extension response signal.

Thus, not only the wire breakage of the line extending from the central station to the local station but also fault of the local station as well as that of the associated units to be controlled/supervised can be detected. In that case, the abnormality information from the local stations can concentratively be monitored or managed by the central station.

Although it has been described previously that the seizing operation is performed by using the ordinary frame of the format illustrated in FIG. 3A, it should be mentioned that the extended frame illustrated in FIG. 3B can equally be made use of in the seizing operation. In that case, the information concerning the types of the local stations may be sent back to the central station as the extension response, which information may then be stored in the central station for consolidated management thereof. To this end, a memory such as EEPROM or the like for storing the local station information should preferably be incorporated in the central station.

Figure 4:
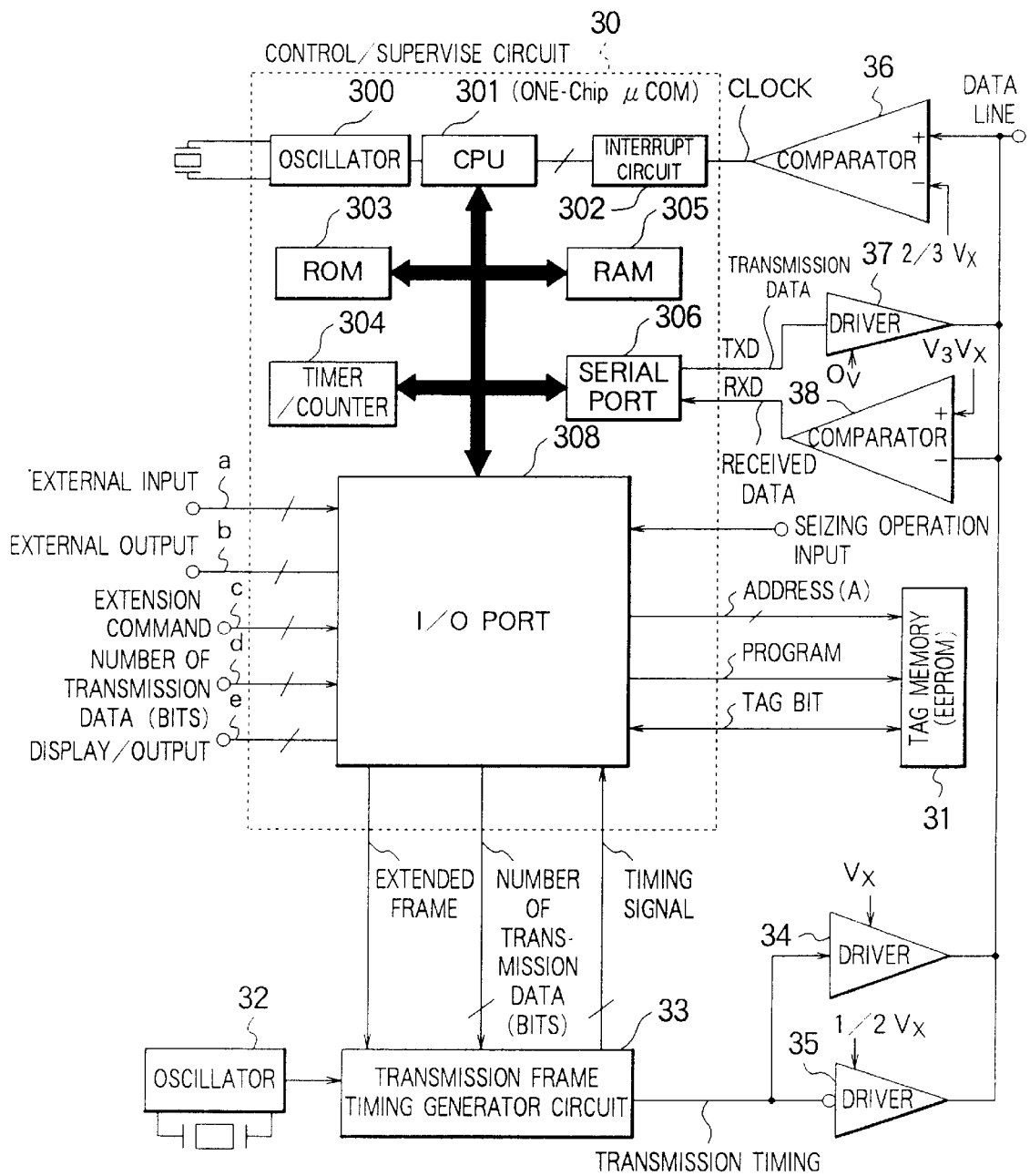
FIG. 4 is a block diagram showing schematically a circuit configuration of a central station in the control/supervisory signal transmission/reception system according to the first embodiment of the invention.

FIG. 4 is a block diagram showing schematically and generally a circuit configuration of the central station in the control/supervisory signal transmission/reception system according to the first embodiment of the present invention.

Referring to the figure, the central station includes a control/supervise unit 30, a tag memory 31 for storing the results of the seizing operation, an oscillator 32 for generating a basic clock signal, a transmission frame timing generator circuit 33, a driver 34 for generating a power supply voltage level $V_x$ (e.g. 24 volts) on the data signal line D (indicated by D line in FIG. 4), and a driver 35 for generating a voltage level $V_x/2$ (=12 volts) on the data signal line D. The drivers 34 and 35 are so coordinated as to generate the level of 24 volts during the first half of a clock pulse signal while generating the voltage level of 12 volts during the second half of the clock pulse signal, as described hereinbefore by reference to FIGS. 3A and 3B. Further, the central station includes a comparator 36 for comparing the voltage of the data signal line D with a voltage level of $2V_x/3$ (=16 volts) to thereby output logic "1" pulse when the former is higher than the latter while outputting logic "0" if vice versa, a driver 37 for generating zero volt (ground level) on the data signal line D when the transmission data (i.e., data for transmission or TXD) is "1" during the second half of the period for data signal transmission of the clock signal is "1" while generating no output when the transmission data is "0" (i.e., when the voltage of $V_x/2$ is generated by the driver 35), and a comparator 38 for comparing whether the voltage level of the data received via the data signal line D is higher or lower than the voltage level $V_x/3$ (=8 volts). When the voltage level of the received data is higher than $V_x/3$, the comparator 38 outputs logic "0" (12 volts), while when the former is lower than the latter, the comparator 38 outputs zero-volt signal representing the logic "0". Parenthetically, it should be mentioned that the central station is equipped with a power supply source for generating the voltages of the levels as required, although illustration of such power supply source is omitted. Of course, the electric power may be supplied to the central station from an external power source not shown either.

The control/supervise unit 30 may be constituted by a one-chip microcomputer which includes an oscillator 300, a CPU (central processing unit) 301, an interrupt circuit 302, a ROM (read-only memory) 303, a timer/counter 304, a RAM (random access memory) 305, a serial port 306 and an input/output port 308.

Provided for the control/supervise unit 30 are so-called external input and output terminals a and b which are connected to a sequence controller, a programmable controller or the like (not shown) incorporated in a control console (not shown either) in which the central station is installed, wherein control signals to be supplied to the local stations are inputted through the terminal a from the external controller for controlling the local stations by way of the central station, while supervisory signals supplied to the central station from the local stations destined for performing supervising operation are outputted from the terminal b to the controller mentioned above. Further, a terminal c is provided for receiving a command for the seizing operation (described later on) and the extension command from the controller mentioned above. On the other hand, a terminal d is adapted to receive a signal indicating a number of data for transmission to the local stations, which signal may be generated by a setting switch or the like (not shown) incorporated in the external controller or provided in association with the central station. Finally, a terminal e is provided for outputting a signal indicating, for example, an abnormality suffering location of the transmission line 3 and/or abnormality state of the local station or that of the associated units to be controlled/supervised to a display device such as a liquid crystal display (not shown) provided in association with the central station or the external controller mentioned above.

The tag memory 31 may be constituted by an EEPROM (electrically erasable programmable read-only memory) which has an address space covering all the ID codes, wherein each address is allocated with a one-bit data capacity. Upon seizing operation, the tag memory 31 is set to an electrically writable state in response to a control signal PROG generated by the input/output port 308 so that tag bits "1" or "0" can be written in the tag memory 31 for all the ID codes, respectively, in dependence on the presence or absence of the end responses from the local stations identified by the ID codes. On the other hand, in the normal or ordinary operation, only the frames containing the ID codes corresponding to the addresses storing the tag bits of "1", respectively, are sent out sequentially, for monitoring or supervising the end responses corresponding to the ID codes mentioned above.

On the other hand, the comparator 36 serves for extracting from the three-level (or three-value) signal on the data signal line D only the timing information generated by the transmission frame timing generator circuit 33 and sent out onto the data signal line D by way of the drivers 34 and 35, whereby a serial clock pulse signal is outputted from the comparator 36.

The transmission data (i.e., data to be transmitted to the local station(s)) designated by reference character TXD contains information or data which are represented by "1" and/or "0" and sent out onto the data signal line D by way of the driver 37. More specifically, for the data bit of logic "1" of the transmission data, the driver 37 sends out a zero-volt pulse signal onto the data signal line D, while for the data bit of "0", the driver 37 outputs no signal. Thus, in the latter case, the data signal line D remains at the original voltage level of 12 volts. For synchronization in the bit timing for the data transmission, the output of the interrupt circuit 302 to which the clock signal mentioned previously is inputted is made use of.

The received data RXD is a serial pulse signal containing only the data pulses (logic "1") of the level not higher than 12 volts ($V_x/2$) extracted from the three-level or three-value signal on the data signal line D. For deriving the received data RXD, the comparator 38 is provided for the purpose of comparison of the level of 8 volts ($V_x/3$). To this end, the transmission data TXD mentioned above is inputted to the other input terminal of the comparator 38.

The transmission frame timing generator circuit 33 is designed for generating not only a serial transmission timing signal for transmitting the ordinary frame containing the start signal, the data signal, the ID code and the end signal or the extended frame containing the start signal, the data signal, the ID code, the end signal containing the extension flag and the extension code but also a parallel timing signal. The serial transmission timing signal is converted into two levels $V_x$ and $V_x/2$ through the pair of drivers 34 and 35 to be sent out onto the data signal line D. On the other hand, the parallel timing signal generated by the transmission frame timing generator circuit 33 is utilized in branching decision in the operation or processing procedure (see FIGS. 5 and 6) executed by the control/supervise unit 30, details of which will be described later on. Further, the information concerning the number of data to be transmitted as generated by the control/supervise unit 30 represents a parameter value indicating the bit number n of the data signal contained in the frame. Further, the extended frame information outputted from the control/supervise unit 30 represents a control signal for determining whether the frame structure for the extended frame shown in FIG. 3B is to be adopted or not.

The central station performs the seizing operation in order to record or store the information concerning the structures and/or functions of the local stations connected to the central station upon activation of the control/supervisory signal transmission/reception system or upon alteration thereof. In the seizing operation, information concerning the presence or absence of the end responses from a plurality of local stations connected to the central station is written in the tag memory 31 mentioned previously in one-to-one correspondence to the ID codes, respectively. The frame employed in performing the seizing operation may be realized in a same frame structure as that shown in FIG. 3A. More specifically, the frames #0, #1, . . . , #(N−1) containing the ID codes 0, 1, . . . , N−1, respectively, are sequentially sent out onto the transmission line 3. Upon reception of the end responses from the local stations, the tag bits "1" are written in the tag memory 31 at the addresses corresponding to the ID codes of the local stations which issued the end responses, respectively, while the tag bits "0" are written at the addresses corresponding to the ID codes of the local stations which have issued no end responses. By virtue of this arrangement, the central station can hold the tag bits in correspondence to the ID codes of the local stations, respectively, until the system configuration of the control/supervisory signal transmission/reception system is altered, regardless whether the power supply to the control/supervisory signal transmission/reception system is interrupted or not.

Figure 5:
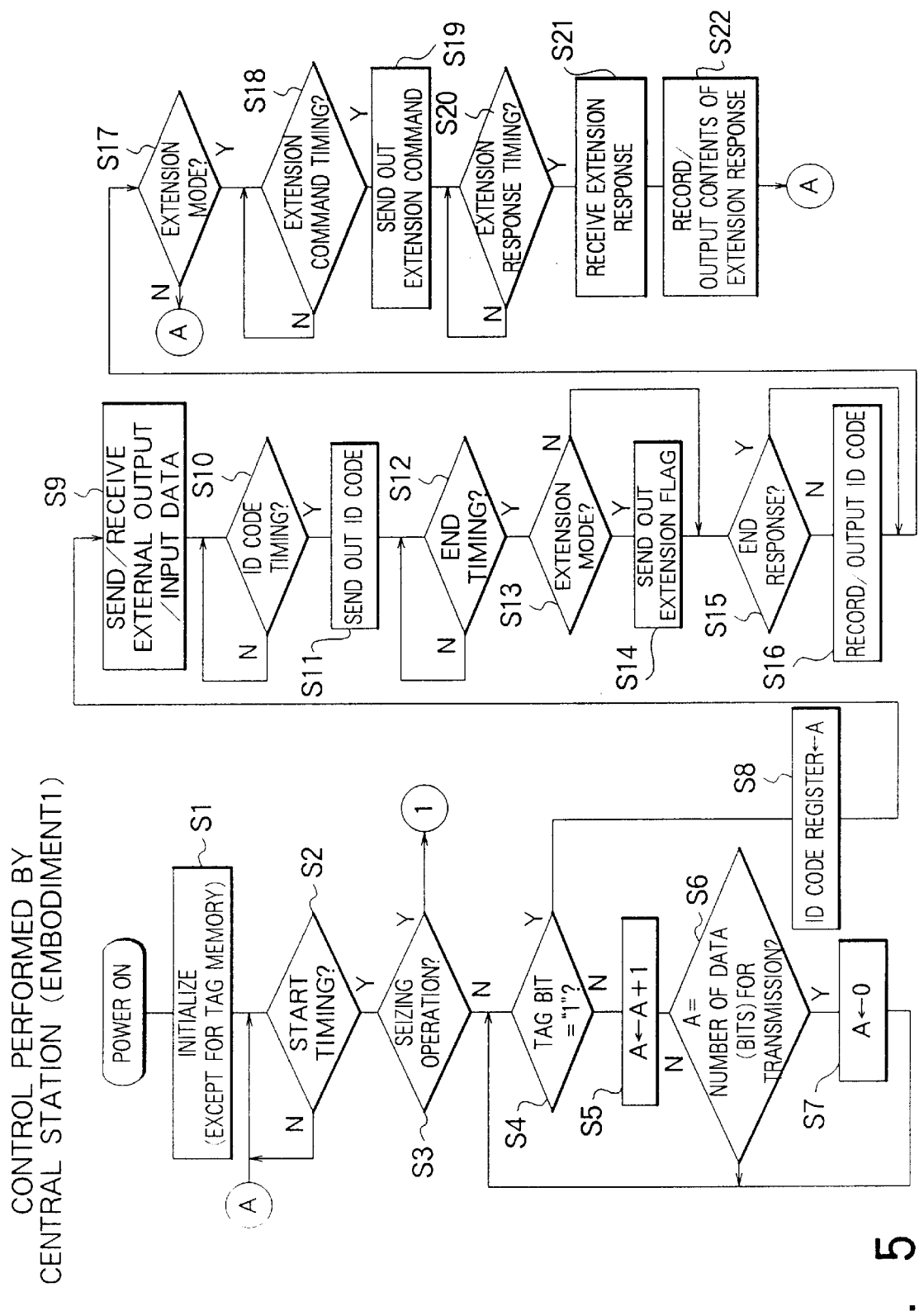
FIG. 5 shows in combination with FIG. 6 a flow chart for illustrating control procedure executed by a central station of the control/supervisory signal transmission/reception system according to the first embodiment of the invention.
Figure 6:
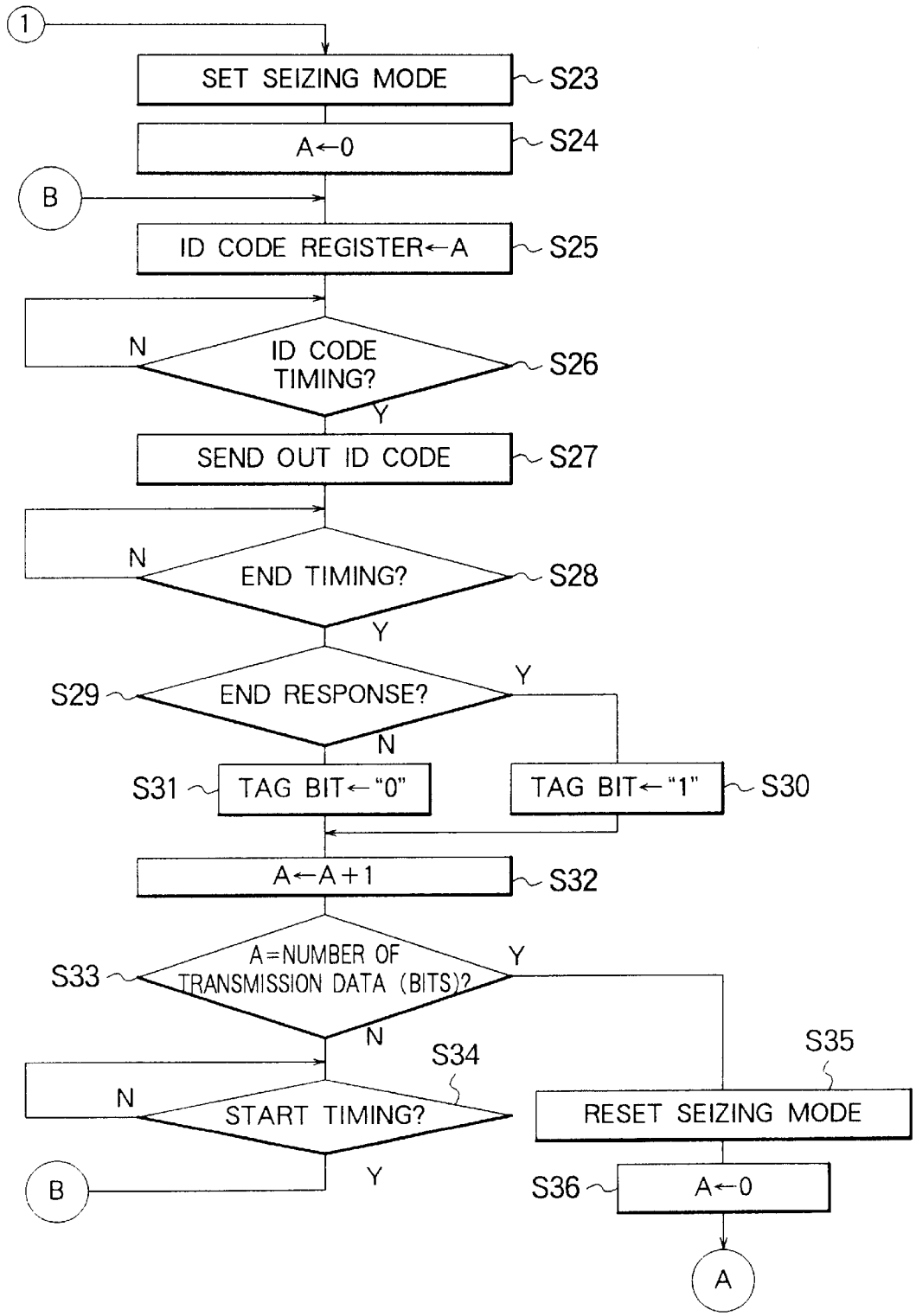
FIG. 6 shows in combination with FIG. 5 a flow chart for illustrating control procedure executed by the central station in the control/supervisory signal transmission/reception system according to the first embodiment of the invention.

FIGS. 5 and 6 show in combination a flow chart for illustrating control procedure effected by the control/supervisory signal transmission/reception system according to the instant embodiment of the present invention.

Referring to the figures, initialization such as processing for setting the number of data for transmission or the like is performed in a step S1 shown in FIG. 5 in succession to power-on of the control/supervisory signal transmission/reception system. Subsequently, in a step S2, decision is made as to the start timing. When the decision in the step S2 results in affirmation "Y", then a step S3 is executed to decide whether the seizing operation is commanded or not from the external controller by operator. This decision (step S3) can be validated by checking whether or not the command for designating the seizing operation is inputted to the input/output port 308 incorporated in the CPU 301 (see FIG. 4). When the seizing operation is commanded, the processing proceeds to the processing routine illustrated in FIG. 6.

When the seizing operation is commanded, the seizing operation mode is set up (step S23 in FIG. 6). Information of this seizing operation mode is stored in the mode setting area of the RAM 305 of the control/supervise unit 30. Subsequently, a variable A of value "0" is set in a variable register provided in the RAM 305 in a step S24, which is followed by a step S25 where the content of the variable A (i.e., "0") is placed in an ID code register provided in the RAM 305 shown in FIG. 4. In a step S26, decision is made as to the timing (time point) for sending out the ID code. When the decision step S26 results in affirmation "Y", the ID code as set is sent out in a step S27 (FIG. 6). Subsequently, the end signal is sent out from the transmission frame timing generator circuit 33 and then decision is made as to whether or not it is an end timing (i.e., a time point for issuing the end response) in a step S28. When the answer of the step S28 is affirmative "Y", decision is then made as to presence or absence of the end response (zero-volt level) in a step S29 shown in FIG. 6. When the end response is detected (i.e., when the decision step S29 results in "Y"), the content of the register for the variable A (corresponding to the address of the relevant ID code) is written as the tag bit "1" in the tag memory at the corresponding address. On the contrary, unless the end response is received, bit "0" is written in the tag memory. Refer steps S30 and S31 in FIG. 6.

Subsequently, the variable A is incremented by "+1" (updating of the variable A) in a step S32 shown in FIG. 6, whereupon decision is made in a step S33 whether or not the updated value of the variable A is equal to the number of data for transmission (i.e., transmission data value set at the input/output port 308 shown in FIG. 4). When the decision step S33 results in negation "N", decision is then made as to the start timing in a step S34. When the decision step S34 results in affirmation "Y", the processing step S25 is resumed, whereupon the processing steps succeeding to the step S26 is executed again. In this way, the value of the variable A is updated sequentially to thereby update correspondingly the ID code sequentially, whereby operation for writing the tag bits in the tag memory is executed repetitionally.

When it is decided in a step S33 that the variable A has reached a same value as the number of transmission data which is equal to a maximum value of the ID plus one, the seizing operation mode is reset in a step S35 with the variable A being set to zero in a step S36, whereupon the step S2 shown in FIG. 5 is resumed.

In the seizing operation processing flow of illustrated in FIG. 6, the transmission/reception processing for the external input/output data (corresponding to the processing in the step S9 shown in FIG. 5) is absent.

Accordingly, the output data is cleared in the central station with the input data being neglected. However, by executing the reception/transmission processing for the external input/output data in succession to the processing in the step S25 shown in FIG. 6, the processing for transmission/reception of the external input/output data can be executed in the central station even in the seizing operation mode.

Now turning back to FIG. 5, when it is decided in the step S3 that the seizing operation mode is not enabled, operation for reading the tag memory 31 is performed by using the ID code corresponding to the variable A as the address, although this processing step is omitted from illustration in FIG. 5, whereon decision is made as to whether the tag bit is "1" (step S4 in FIG. 5). In case the tag bit is "0", the variable A is incremented by one (step S5 in FIG. 5), which is then followed by a decision step S6 where it is decided whether the value of variable A coincides with the number of transmission data which is equal to the maximum value of the ID plus one. When coincidence is found, the variable A is set to zero in a step S7 in FIG. 5. On the other hand, when no coincidence is detected, the tag memory is read out with the updated variable A as the address, whereupon it is decided whether or not the relevant tag bit is "1" (step S4 in FIG. 5). When it is decided that the tag bit is "1", the variable A is set in the ID code register (step S8 in FIG. 5), whereupon transmission/reception of the external input/output data is performed (step S9 in FIG. 5). Subsequently, decision is made as to the ID code timing in a step S10. If the decision step S10 results in affirmation "Y", the relevant ID code is sent out in a step S11.

In succession, in a step S12, decision is made as to the timing for sending out the end signal, as in the case of the step S26 shown in FIG. 6. When the end timing is detected, then decision as to the extension mode is made in a step S13. The decision as to the extension mode can be realized by checking whether or not the extension mode is set in a mode display area of the RAM in response to the extension command c supplied through the input/output port 308.

In the case of the extension mode, the extension flag contained in the end signal (see FIG. 3B) is sent out in a step S14 shown in FIG. 5, whereupon decision is made as to the end response (step S15, FIG. 5). Unless the end response is issued, then the ID code contained in the same extended frame is stored in the RAM 305 and at the same time outputted to the external display unit (step S16, FIG. 5). On the other hand, when the end response is detected and when the processing in the aforementioned step S16 is completed, then decision is made as to whether or not the extension mode is to be continued (step S17, FIG. 5). When the decision step S17 results in negation "N", then the processing resumes the step S2. By contrast, when the answer of the decision step S17 is affirmative "Y", indicating the extension mode, decision is made as to the timing is for the extension command (step S18). If so, the extension command is sent out in a step S19. Subsequently, decision is made as to the timing for the end response in a step S20 (FIG. 5). If end response timing is determined, the end response is received in a step S21, whereon the content of the end response is recorded or stored and at the same time outputted externally for the display or for the other purpose in a step S22, whereupon the return is made to the step S2.

Through the procedure described above by reference to the flow charts of FIGS. 5 and 6, transmission/reception or transfer of the input/output data is performed between the central station and local stations in the seizing operation mode and the ordinary frame mode (non-extension mode), while in the extension mode, operation for transferring the extension command and the extension response contained in the extended frame is performed between the central station and local stations.

In conjunction with the control procedure performed by the central station, it has been described that the decision as to whether or not the extension mode is to be set is made in response to the command for the extension mode issued at the central station in the ordinary operation mode (see step S13, FIG. 5). However, the present invention is never restricted thereto but may be realized in a different manner, which will be mentioned below.

So long as the system is operating normally, the non-extension mode is validated and the end response from the local station is monitored or supervised, wherein unless the end response is received, then the operation mode is automatically changed over to the extension mode, starting from the succeeding frame. To this end, such arrangement may be adopted that when abnormality occurs in a given local station, then the given local station is inhibited from sending out the end response to the non-extended frame. In this way, a so-called local station-initiative system can be realized in which the local station suffering some abnormality issues a request for the extension mode to the central station.

Next, description will be directed to a structure of a local station according to a first embodiment of the present invention which performs operations corresponding to those of the central station described above.

Figure 7:
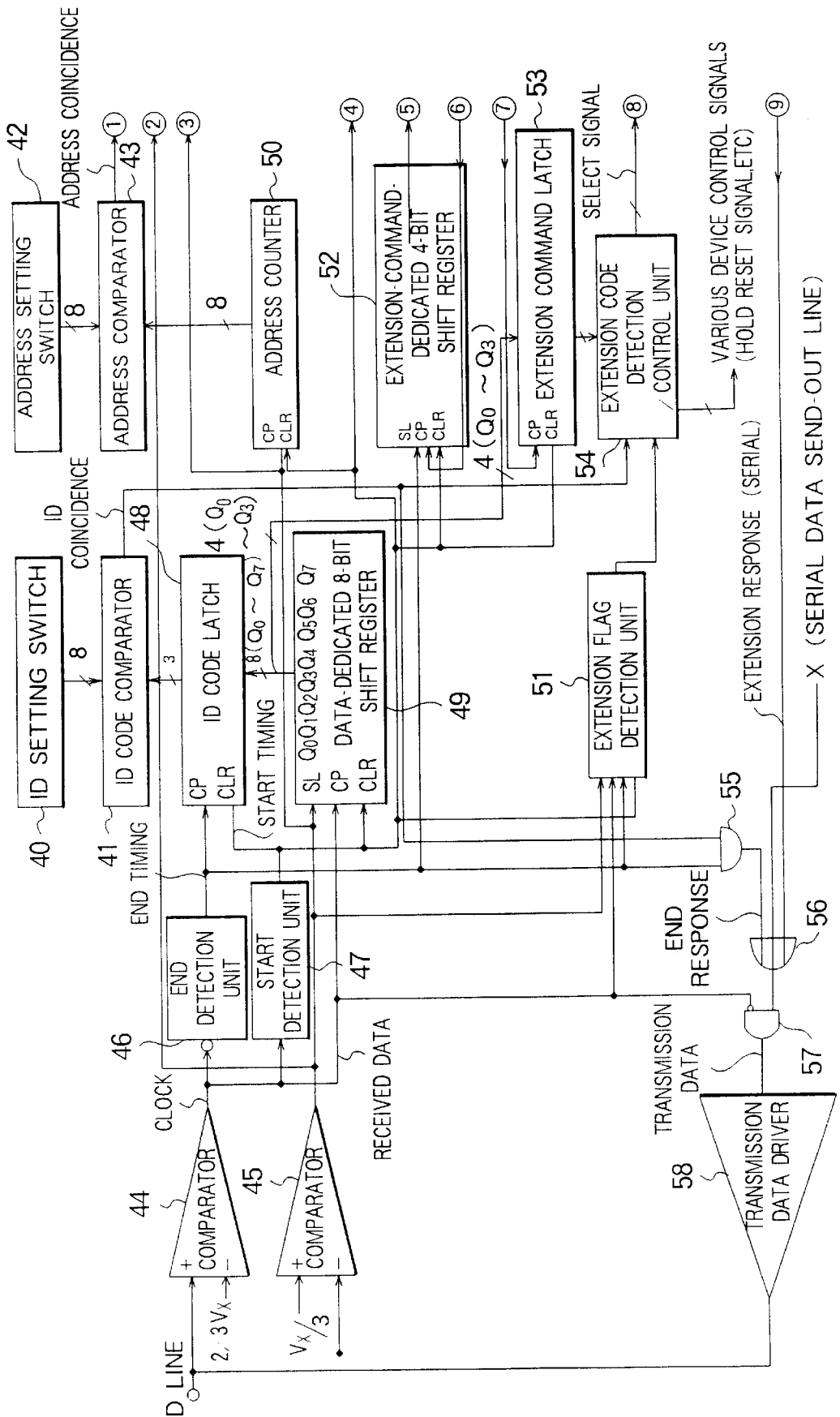
FIG. 7 is a block diagram showing in combination with FIG. 8 a circuit configuration of a local station in the control/supervisory signal transmission/reception system according to the first embodiment of the invention.
Figure 8:
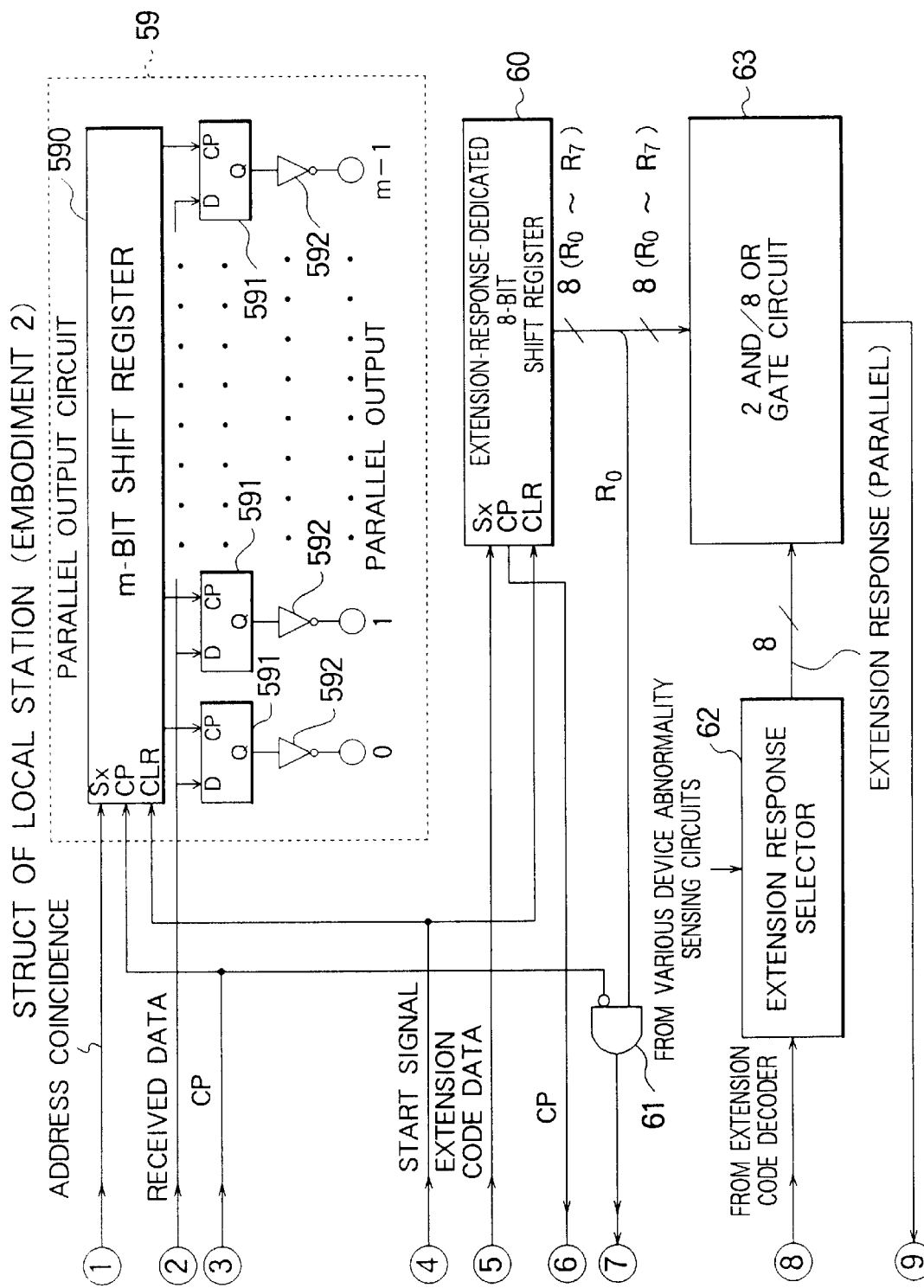
FIG. 8 is a block diagram in combination with FIG. 7 a circuit configuration of the local station according to the first embodiment of the invention.

FIGS. 7 and 8 in combination show in block diagrams a circuit configuration of the local station according to the first embodiment of the invention. In this case, it is assumed that the local station serves as a so-called output terminal which is so arranged as to receive control data from the central station and output or transfer the control data to the units to be controlled which are connected to the local station. However, it should be appreciated that the structure of the local station remains essentially same even when the local station serves as an input terminal arranged to receive data from the units to be supervised and send the data to the central station with only exception that a parallel output circuit 59 shown in FIG. 8 is replaced by a parallel input circuit so as to receive data signals originating in the units to be supervised or associated sensors. Parenthetically, lines denoted by numerals each in circle in FIG. 7 are connected to those lines denoted by same numerals each in circle in FIG. 8.

Further, it is noted that a power supply source arrangement is shown neither in FIG. 7 nor in FIG. 8. In this conjunction, it should be mentioned that the central station and the local station(s) are connected by a common transmission cable including the data signal line D, the ground potential line G and the power supply line P which can be spared in the system of a small scale, wherein electric power for the local station, the units to be controlled/supervised and sensors can be derived from the data signal line D when the power supply line P is spared, as is disclosed in U.S. Pat. No. 5,223,826 cited hereinbefore.

Referring to FIGS. 7 and 8, the local station as illustrated includes an ID setting switch 40 for setting an ID code allocated to the local station, and an ID code comparator 41 for comparing an ID code contained in the frame sent from the central station and inputted to an ID code latch circuit 48 mentioned hereinafter with the ID code set at the ID setting switch 40 for generating an ID coincidence signal when the comparison mentioned above shows coincidence between both the ID codes, to thereby drive a transmission data driver 58 (also described hereinafter) for the purpose of transmitting the end response at the end timing, as described hereinbefore. On the other hand, when coincidence is not found between both the ID codes, the end response is not generated.

Now, referring to FIG. 7, the local station further includes an address setting switch 42 for setting therein an address allocated to the local station under consideration, an address comparator 43 for comparing a count value of clocks outputted from an address counter 50 (mentioned later on) with the address set at the address setting switch 42, to thereby generate an address coincidence signal when the comparison mentioned above results in coincidence, a comparator 44 for comparing the signal on the data signal line D with a voltage level of $2V_x/3$ (=16 volts) to thereby extract clocks (also referred to as cp), a comparator 45 for comparing the signal on the data signal line D with a voltage level of $V_x/3$ (=8 volts) to thereby identify whether the data state or level (the second half of the clock pulse signal) is at 12 volts ("0") or at zero volt ("1"), and an end detection unit 46 for inverting and integrating the clock extracted through the comparator 44 for thereby detecting the data state or level not higher than $V_x/2=12$ volts which level is of 1.5-bit length and located only at the second half of the end signal. When the above data state or level is detected, the end detection unit 46 generates an end timing signal.

Furthermore, the local station includes a start detection unit 47 for detecting a start signal of a non-data state or level $(V_x)$ over a long period corresponding to five bits in the case of the instant embodiment of the invention, wherein the start signal is detected by integrating the clock signal extracted through the comparator 44, and an ID code latch circuit 48 for latching 8-bit data (representing the ID code) received immediately before the end timing mentioned hereinbefore, wherein the 8-bit data are supplied in parallel as outputs $Q_0$ to $Q_7$ of a data-dedicated 8-bit shift register 49. More specifically, received data extracted from the data signal line D are inputted serially to the data-dedicated 8-bit shift register 49 and shifted with the clock pulse signal cp, wherein all the received data are cleared in response to a start timing signal affixed to the leading end of the frame. Furthermore, there are provided in the local station the address counter 50 for counting the clock pulses cp generated by the comparator 44, the address counter 50 being cleared in response to the start signal located at the leading end of the frame, and an extension flag detection unit 51 for detecting the extension flag contained in the frame sent from the central station. More specifically, the extension flag is contained in the end signal ④ in the operation of extension mode, as described hereinbefore by reference to FIG. 3B.

Further provided in the local station is an extension-command-dedicated 4-bit shift register 52 to which the end timing signal is serially inputted and sifted with the aforementioned clock (cp), wherein all the bits of the end timing signal are cleared in response to the start timing signal positioned at the leading end of the frame. Furthermore, an extension command latch circuit 53 is provided which receives as input thereto the first to fourth bits ($Q_0$ to $Q_3$) in parallel from the output of the data-dedicated 8-bit shift register 49 to latch these bits in response to a first output bit (RO) of an extension-response-dedicated 8-bit shift register 60 described hereinafter, for thereby holding the extension command contained in the received frame.

Provided additionally is an extension code detection/control unit 54 which is so designed as to decode the output ($C_0$ to $C_3$) of the extension command latch circuit 53 mentioned above to thereby activate one of plural select signal lines (carrying a signal representing the result of decoding of the command from the central station) when the ID coincidence signal outputted from the ID code comparator 41 and the output of the extension flag detection unit 51 are validated. Further, the local station includes an AND circuit 55, an OR circuit 56 for outputting the end response, the extension response and serial data (such as the supervisory signal or the like and designated by reference character X in FIG. 7) to be sent to the central station from the local station, an AND circuit 57 for controlling a timing for sending out the data, and a driver 58 for outputting the transmission data (i.e., data for transmission) onto the data signal line D from the local station.

Next, referring to FIG. 8, a parallel output circuit 59 includes an m-bit shift register 590 to which the address coincidence signal of "1" is supplied from the address comparator 43 mentioned previously, wherein the bit "1" is shifted through the parallel output circuit 59 in response to the clock cp, as a result of which the bits "1" are sequentially outputted from the individual bit positions of the m-bit shift register 590. Thus, a series of m bits of the received data signal are set sequentially in latch circuits 591 each of which is constituted by a flip-flop circuit. The outputs of the individual latch circuits 591 are supplied to the units to be controlled/supervised in parallel via buffers 592, respectively. Parenthetically, "m" represents the number of the units to be controlled/supervised. In the case of the control/supervisory signal transmission/reception system according to the instant embodiment of the invention, it is assumed that the local station serves as the output terminal and thus the parallel output circuit 59 is provided. However, the local station may serves as the input terminal. In that case, the parallel output circuit 59 is replaced by a parallel input circuit, although it is not shown in the figure. However, a typical one of such parallel input circuit is disclosed in U.S. Pat. No. 5,223,826 (which corresponds to Japanese Patent Publication No. 6997/1991), the disclosure of which is herein incorporated by reference.

The data bits outputted from the final stage of the extension-command-dedicated 4-bit shift register 52 are serially inputted to an extension-response-dedicated 8-bit shift register 60 to be shifted in response to the clock signal cp, which register 60 responds to the data bits by generating output bits $R_0$ to $R_7$ as position information for the serial bits of the extension response contained in the frame. All the bits of the extension-response-dedicated 8-bit shift register 60 are cleared by the start timing signal positioned at the leading end of the frame. An AND circuit 61 generates a signal which rises up at a mid point of the leading output pulse $R_0$ of the extension-response-dedicated 8-bit shift register 60, wherein the signal indicated by ⑦ in FIG. 8 is used for triggering the latch operation of the extension command latch circuit 53.

An extension response selector 62 serves to selectively output as parallel extension response signal the abnormality detection signals (each of 8 bits) obtained from the individual units to be controlled/supervised in correspondence to the select signals generated as a result of decoding of the extension command by the extension code detection/control unit 54. Finally, a 2-AND/8-OR gate circuit 63 sends out the extension response signal bits supplied from the extension response selector 62 sequentially as serial extension response signal bits in conformance with the timings of the eight bits $R_0$ to $R_7$, respectively.

Figure 9:
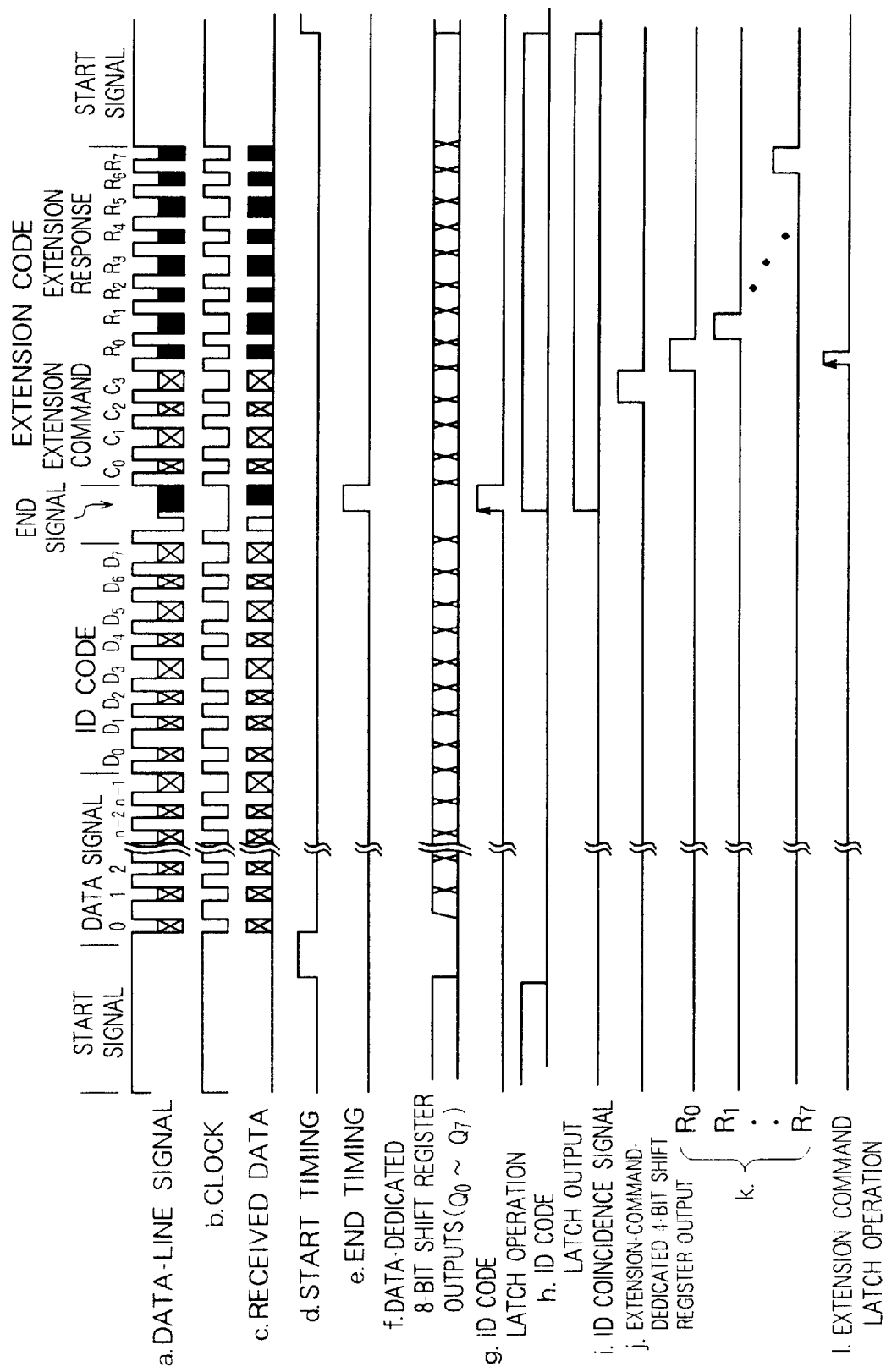
FIG. 9 shows in combination with FIG. 10 a timing chart for illustrating operation of a local station in the control/supervisory signal transmission/reception system according to the first embodiment of the invention.
Figure 10:
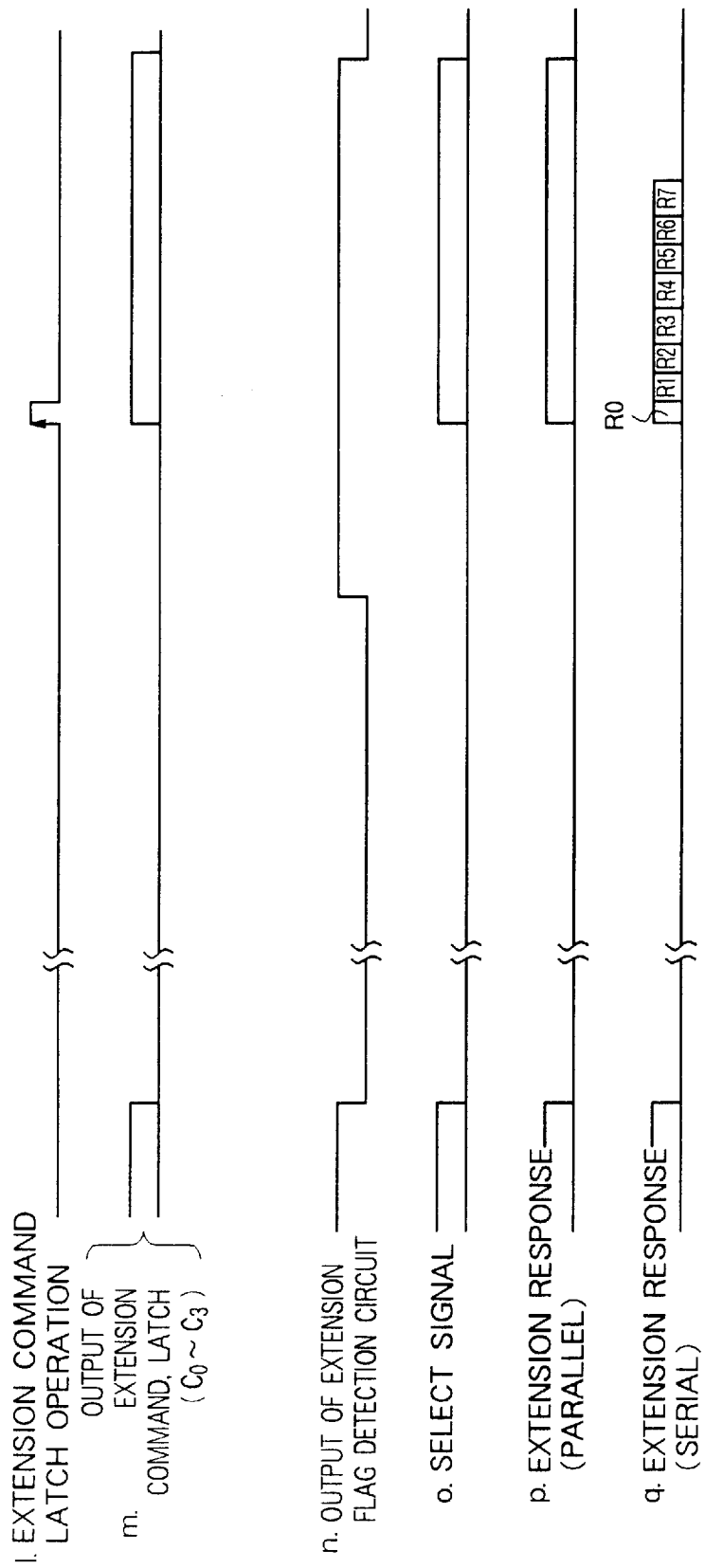
FIG. 10 shows in combination with FIG. 9 a timing chart for illustrating operation of the local station in the control/supervisory signal transmission/reception system according to the first embodiment of the invention.

FIGS. 9 and 10 in combination show a timing chart for illustrating operation of the local station according to the first embodiment of the invention on the assumption that the local station is implemented in the structure described hereinbefore by reference to FIGS. 7 and 8 so as to serve as the output terminal and that the extended frame is sent from the central station to the local station. At this juncture, it should be mentioned that a waveform "l" shown in FIG. 9 is shown also in FIG. 10 in duplicate in order to ensure temporal consistency between both the figures.

Referring to FIG. 9 at first, upon reception of the start signal contained in the frame supplied from the central station, as shown at a in the figure, the start detection unit 47 shown in FIG. 7 generates a start timing signal shown at d in FIG. 9, whereby the data-dedicated 8-bit shift register 49, the ID code latch circuit 48, the extension command latch circuit 53 and the extension flag detection unit 51 are reset, as can be seen from waveforms f and h shown in FIG. 9 and m to q shown in FIG. 10. Upon reception of the data signal contained in the frame sent from the central station (see a in FIG. 9), the comparator 44 shown in FIG. 7 generates the clock pulse signal cp of a waveform b shown in FIG. 9, while the comparator 45 outputs the received data shown at c in FIG. 9. Parenthetically, the rectangle inserted with a mark "X" in the waveform c assumes the logic level "0" when the data signal voltage level is 12 volts (higher than $V_x/3=8$, to say in general) while assuming logic "1" when the data signal voltage level is zero volt (lower than 8 volts).

The clock pulse signal is counted in a like manner as in the address counter system disclosed in U.S. Pat. No. 5,223,826 cited hereinbefore. More specifically, the clock pulses of the clock signal cp are counted by the address counter 50 shown in FIG. 7. When the count value of the address counter 50 coincides with the address preset in the address setting switch 42 (FIG. 7), the m-bit shift register 590 incorporated in the parallel output circuit 59 (FIG. 8) is driven by the coincidence signal appearing at ① in FIG. 7, whereby the received data bits as inputted in succession (indicated by ② in FIG. 7) are sequentially latched by the latch circuits 591 (FIG. 8). Thus, the data bits are supplied to the units to be controlled/supervised (not shown) in parallel.

Although the data signal bits shown at f in FIG. 9 are inputted to the data-dedicated 8-bit shift register 49 (FIG. 7) to be shifted thereby, the output of the data-dedicated 8-bit shift register 49 is not utilized ordinarily. However, when the end signal is inputted in succession to the inputting of the ID code shown at a in FIG. 9, the end timing signal shown at e in FIG. 9 is generated by the end detection unit 46 (FIG. 7), as a result which the ID code latch circuit 48 (FIG. 7) is driven to thereby latch the 8 bits stored in the data-dedicated 8-bit shift register 49 at that time point. In this conjunction, the timing for the latch operation mentioned above and the ID code latch output are shown at g and h, respectively, in FIG. 9. At this time point, the output of the ID code latch circuit 48 shown in FIG. 7 and the ID code preset in the ID setting switch 40 are compared with each other by the ID code comparator 41. When the comparison results in coincidence, an ID coincidence signal shown at i in FIG. 9 is generated. In response to this coincidence signal, the AND circuit 55 generates the end response signal to drive the extension code detection/control unit 54.

The end signal shown at a in FIG. 9 contains the extension flag (composed of the third level of 0.5 bit length) succeeding to the first level of (24 volts) of 0.5 bit length) indicating the extension mode. When the extension flag detection unit 51 shown in FIG. 7 detects this extension flag, the extension flag detection unit 51 outputs a signal of waveform n shown in FIG. 10 for driving the extension code detection/control unit 54. Further, in response to the end timing signal, logic "1" is set in the extension-command-dedicated 4-bit shift register 52 to be shifted by four bits under the timing of the clock pulse signal gp. In this manner, when the extension code is inputted in succession to the end signal, as illustrated at a in FIG. 9, the four leading bits (constituting the extension command) are inputted to the data-dedicated 8-bit shift register 49 to be shifted through the four leading bit stages, as a result of which the output of a waveform j shown in FIG. 9 (the signal ⑤ shown in FIG. 7) is generated from the final bit stage or position of the extension-command-dedicated 4-bit shift register 52.

The signal of "1" mentioned above is supplied to the input of the extension-response-dedicated 8-bit shift register 60. At the timing of the leading data of the succeeding extension response, the leading bit signal $R_0$ is outputted from the extension-response-dedicated 8-bit shift register 60 to trigger the extension command latch operation, as illustrated at 1 in FIG. 9. Consequently, the four leading bits $Q_0$ to $Q_3$ of the data-dedicated 8-bit shift register 49 are latched by the extension command latch circuit 53, whereby the extension command latch output is generated, as illustrated at m in FIG. 10. Subsequently, the extension code detection/control unit 54 decodes the extension command, whereby parallel output signal bits are generated on the select signal lines, as shown at o in FIG. 10.

Upon reception of the signal bits on the select signal lines, the extension response selector 62 generates the extension response constituted by eight parallel signal bits in correspondence to a plurality of state signals of the abnormality detection circuits connected to the local station, as shown at p in FIG. 10. The extension response signal is then inputted to the 2-AND/8-OR gate circuit 63 to be converted into a serial signal constituted by the output bits $R_0$ to $R_7$ generated by the extension-response-dedicated 8-bit shift register 60, being shifted sequentially under the timing of the clock pulse signal cp. The serial signal is then outputted at the timing illustrated at q in FIG. 10 onto the data signal line D via the OR circuit 56 and the AND circuit 57 shown in FIG. 7.

As mentioned hereinbefore, the frame structure shown at a in FIG. 9 is employed in the extension mode. In the case of the ordinary or normal mode (i.e., in the non-extension mode), each frame as employed is constituted by the start signal, the data signal, the ID code and the end signal which contains no extension flag. In that case, the local station of the configuration shown in FIGS. 7 and 8 performs operations such as detection of address coincidence, transfer of the data signal, sending of the end response upon detection of coincidence in the ID code. On the other hand, in the seizing operation, each of the frames corresponding to all the ID codes is constituted by the start signal, the data signal, the ID code and the end signal, wherein the local stations each implemented in the structure shown in FIGS. 7 and 8 perform the operations for sending the end responses upon detection of coincidence between the ID codes contained in the frames, respectively, and the ID codes preset at or allocated to the individual local stations, respectively.

In the control/supervisory signal transmission/reception system according to the first embodiment of the invention, noise components on the transmission line may increase in dependence on environmental conditions, operating states and other factors. In that case, there may arise such unwanted situation in which the control signal is not always transmitted correctly from the central station to the local stations. The control/supervisory signal transmission/reception system according to a second embodiment of the present invention described below is designed to cope with the problem mentioned above.

Embodiment 2

Figure 11A:
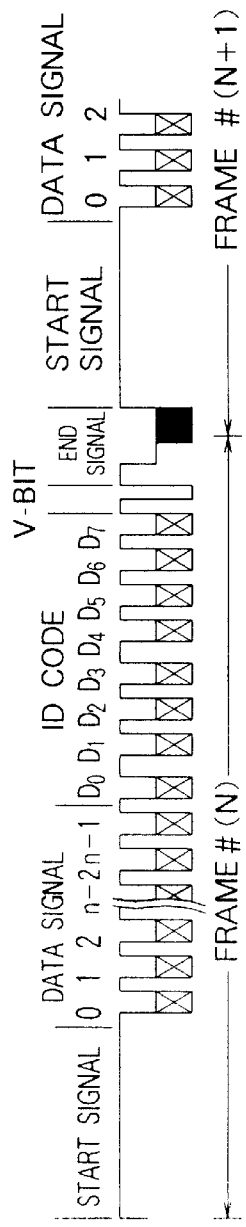
FIG. 11A is a view for illustrating a structure of an ordinary frame employed in an ordinary operation mode of the control/supervisory signal transmission/reception system according to a second embodiment of the present invention.
Figure 11B:
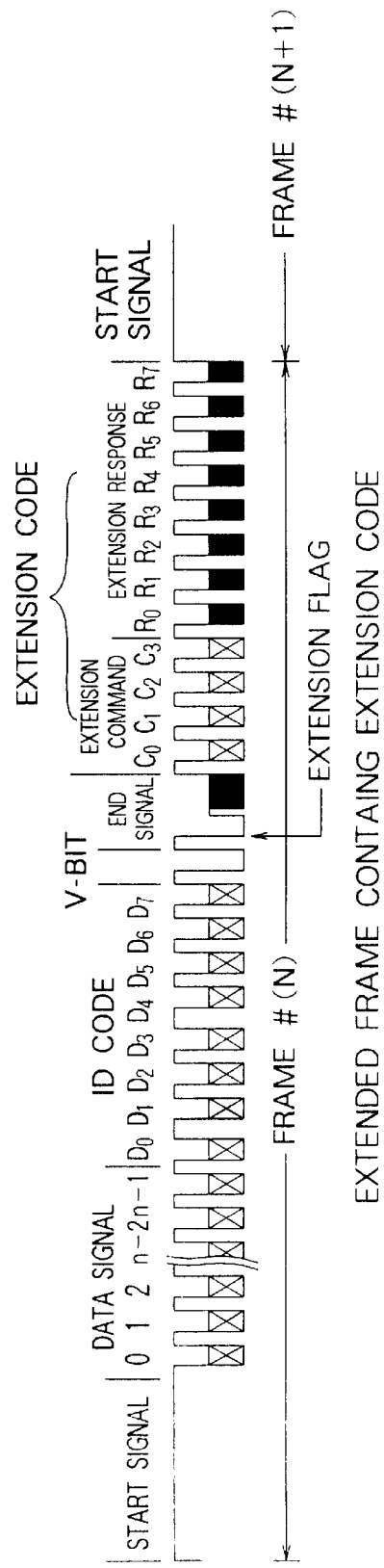
FIG. 11B shows a structure of an extended frame employed in an extension mode in the control/supervisory signal transmission/reception system according to the second embodiment of the invention.

FIG. 11A and 11B are views for illustrating frame structures employed in the control/supervisory signal transmission/reception system according to the second embodiment of the present invention, wherein FIG. 11A shows a normal or ordinary frame (frame for non-extension mode) while FIG. 11B shows an extended frame containing an extension code.

The ordinary frame shown in FIG. 11A and the extended frame shown in FIG. 11B differ from those shown in FIGS. 3A and 3B, respectively, in that a validity bit indicating validity (hereinafter referred to as the V-bit) is additionally provided between the ID code and the end signal. When the V-bit is "0", this means that the data signal is valid, allowing the local station to fetch the data signal. On the other hand, in case the V-bit is "0", this means that the data signal has undergone adverse influence by noise or the like, and thus the relevant local station is inhibited from using the data signal.

The transmission frame timing generator circuit 33 of the central station shown in FIG. 4 is so arranged as to generate the frame of the structure shown in FIG. 11 according to the teaching of the invention incarnated in the second embodiment thereof.

Figure 13:
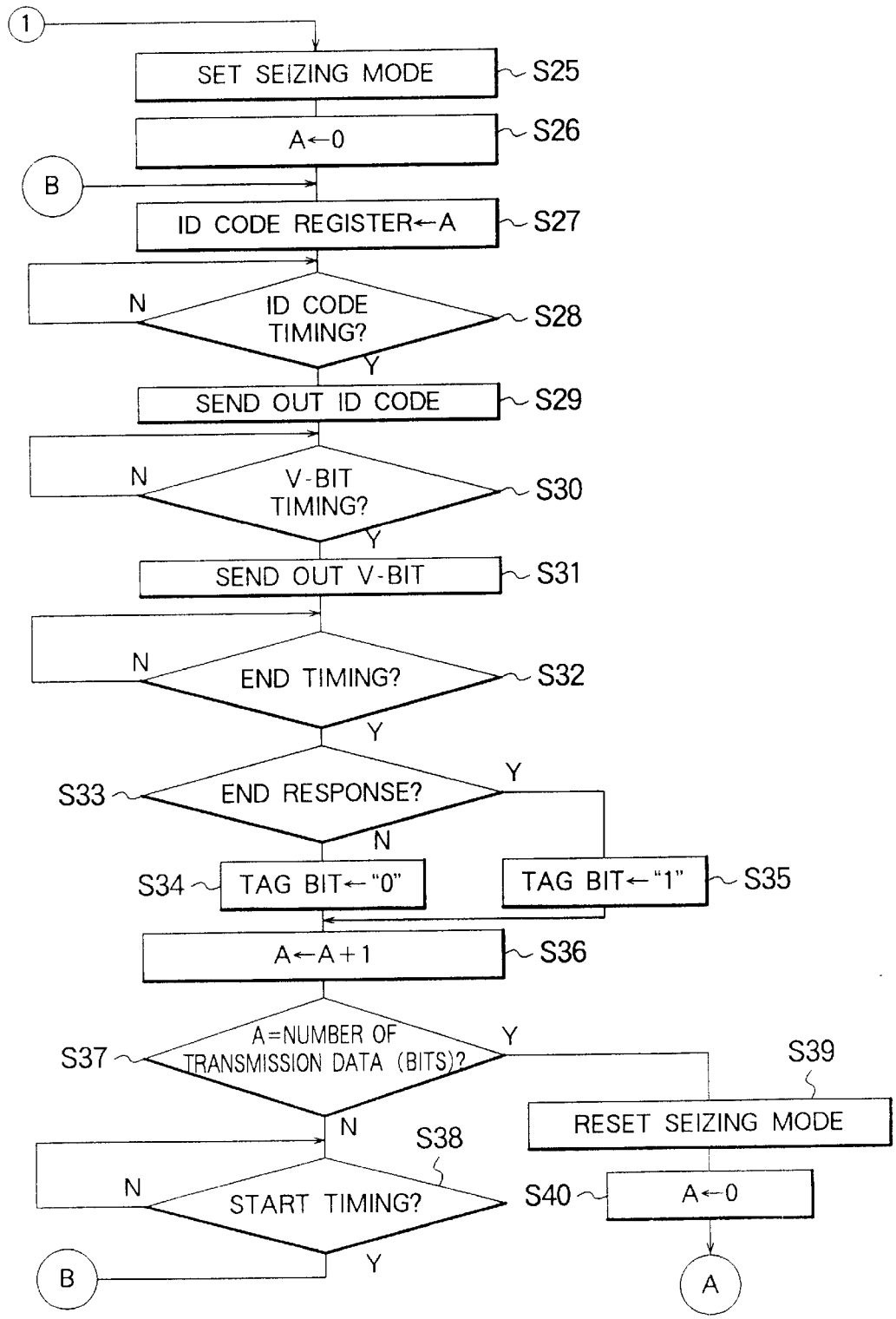
FIG. 13 shows in combination with FIG. 12 a flow chart for illustrating processing operations executed by the central station in the control/supervisory signal transmission/reception system according to the second embodiment of the invention.

FIGS. 12 and 13 in combination show a flow chart for illustrating processing operations performed by the central station in the control/supervisory signal transmission/reception system according to the second embodiment of the invention. The processing flow shown in FIGS. 12 and 13 differs from that shown in FIGS. 5 and 6 in the respects mentioned below.

When the seizing operation is decided in the step S3, the procedure then proceeds to the operation processing illustrated in FIG. 13, whereon the seizing operation mode is set in a step S25 of FIG. 13. Subsequently, processing steps S26 to S29 shown in FIG. 13 which are same as the previously mentioned steps S24 to S27, respectively, are executed to send the ID code. In a step S30 shown in FIG. 13, decision is made as to the timing for the V-bit. If so, the V-bit is sent out in a step S31 shown in FIG. 13. Subsequently, processing steps S32 to S40 are executed. Since these steps S32 to S40 are same as the steps S28 to S36, repeated elucidation is omitted.

On the other hand, when it is decided in the step S3 of FIG. 12 that the seizing operation is not designated, the processing routine from the step S4 for deciding whether the tag bit is "1" or not to the step S11 for sending out the ID code is executed. Since the processing steps S4 to S11 are same as those denoted by like reference characters in FIG. 5, repetitive description of this processing routine will be unnecessary. In succession to the operation for sending the ID code in the step S11, decision is made as to the timing for sending the V-bit in the control/supervisory signal transmission/reception system according to the second embodiment of the invention. (See step S12 in FIG. 12.) If so, the V-bit is sent out in a step S13. The succeeding steps S14 to S24 are essentially same as the steps S13 to S22 shown in FIG. 5. Accordingly, repetition of description is omitted.

Setting of the V-bit at "1" or "0" can be determined in dependence on the system operating condition or noise occurrence state of the transmission line. Of course, operator can set the value of the V-bit with the aid of an input unit in consideration of the situation or environment in which the system is operated.

Besides, the transmission data (TXD) sent out onto the data signal line D via the driver 37 in the control/supervise unit 30 of the central station may be received via the comparator 38, whereupon the received data (RXD) may be collated with the transmission data (TXD) for determining the behavior of the signal on the data signal line D to thereby set the value of the V-bit.

Figure 14:
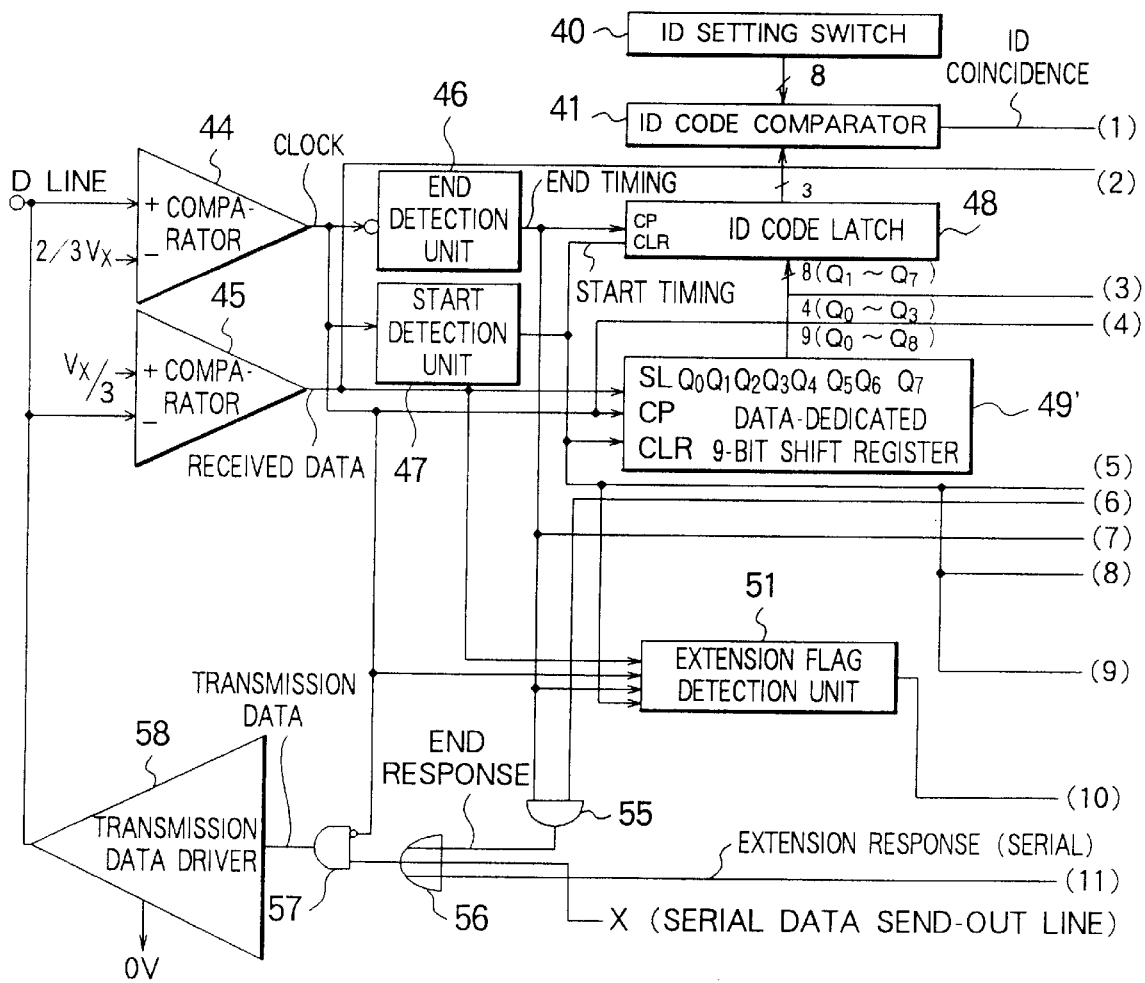
FIG. 14 shows in combination with FIG. 15 a structure of a local station in the control/supervisory signal transmission/reception system according to the second embodiment of the present invention.
Figure 15:
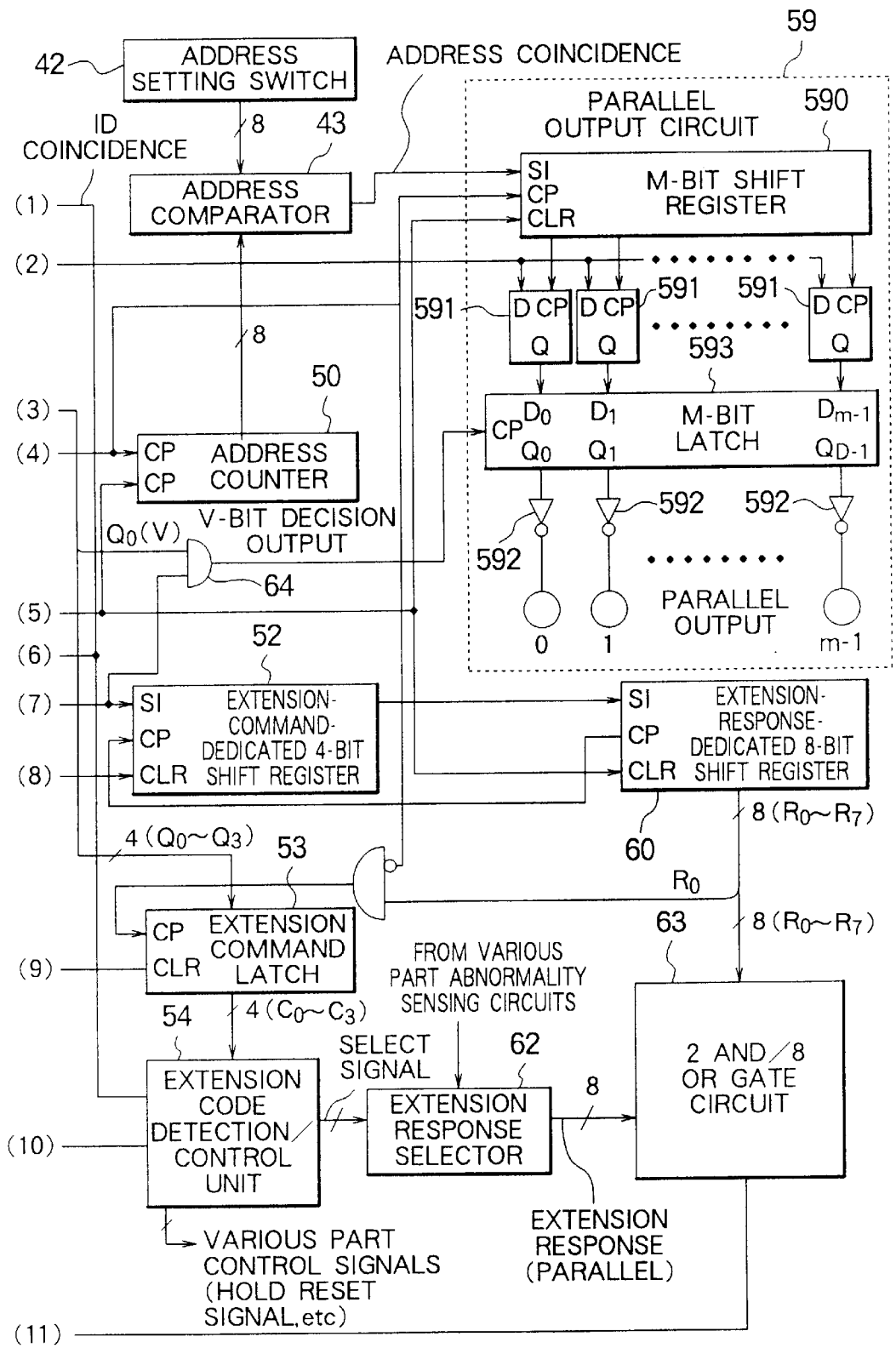
FIG. 15 shows in combination with FIG. 14 the structure of the local station in the control/supervisory signal transmission/reception system according to the second embodiment of the present invention.

FIGS. 14 and 15 in combination show a structure of the local station in the control/supervisory signal transmission/reception system according to the second embodiment of the present invention.

The structure of the local station according to the instant embodiment differs from that of the first embodiment in the respects (1) to (3) mentioned below.

(1) In the case of the local station according to the first embodiment, the data-dedicated 8-bit shift register 49 is employed. By contrast, in the local station according to the second embodiment, a data-dedicated 9-bit shift register 49' is used, as shown in FIG. 14, because of necessity for extracting the V-bit in addition to the eight bits, i.e., 9 bits in total, wherein bit signals are supplied to the ID code latch circuit 48 from terminals $Q_1$ to $Q_8$ of the data-dedicated 9-bit shift register 49', respectively, in parallel.

(2) In order to make decision concerning the value of the V-bit, an AND circuit 64 is provided for logically ANDing the output $Q_0$ (display output of the V-bit) of the data-dedicated 9-bit shift register 49' and the output of the end detection unit 46 (end timing). See FIG. 15.

(3) An m-bit latch circuit 593 is provided between m latch circuits 591 and the buffer 592 in the parallel output circuit 59. See FIG. 15.

By virtue of the arrangement described above, the V-bit is inputted to the terminal $Q_0$ of the data-dedicated 9-bit shift register 49' at the time point corresponding to the end timing, whereby the value of the V-bit can be determined by the AND circuit 64 at the end timing. On the other hand, owing to the shift operation of the m-bit shift register 590 incorporated in the parallel output circuit 59, the data of m bits (control signal) transmitted from the central station are once set sequentially in m latch circuits 591 each constituted by a flip-flop circuit. Subsequently, when the value of the V-bit as detected is "1", then the logic "1" outputted from the AND circuit 64 is applied to the clock terminal of the m-bit latch circuit 593, whereby parallel latching operation is performed. By contrast, when the V-bit is "0", the m-bit latch circuit 593 can not be driven. Consequently, the data signal originating in the central station and held by the individual latch circuits 591 is inhibited from being output- ted as the control signal. In that case, the output state for the preceding frame is held.

As is apparent from the above description, in the control/supervisory signal transmission/reception system according to the second embodiment of the invention, the value of the V-bit is decided at the end timing, and the data output in the local station is controlled in dependence on the detected value of the V-bit. Except for this arrangement, the control/supervisory signal transmission/reception system according to the instant embodiment is essentially same as that of the first embodiment with regards to the structure and the operation. Accordingly, description of operation of the local station by reference to timing chart is omitted.

Modifications

Many features and advantages of the present invention are apparent from the detailed description and thus it is intended by the appended claims to cover all such features and advantages of the system which fall within the true spirit and scope of the invention. Further, since numerous modifications and combinations will readily occur to those skilled in the art, it is not intended to limit the invention to the exact construction and operation illustrated and described.

By way of example, there may be adopted modifications or versions mentioned below.

(1) The address setting switch provided in the local station may additionally imparted with the function for setting the ID code. In that case, the ID code setting switch can be spared. In this conjunction, by providing a function (such as Exclusive-ORing function for inverting the least significant bit or LSB) for performing arithmetic operation such as addition or subtraction for the value held by the address setting switch so that the value resulting from the arithmetic operation can be inputted as the ID code value, it is possible to use the ID code value which differs from the address value as set. In this manner, communication between the local stations having a same address allocated can be conducted because the different ID codes are assigned to these local stations, respectively.

Figure 16:
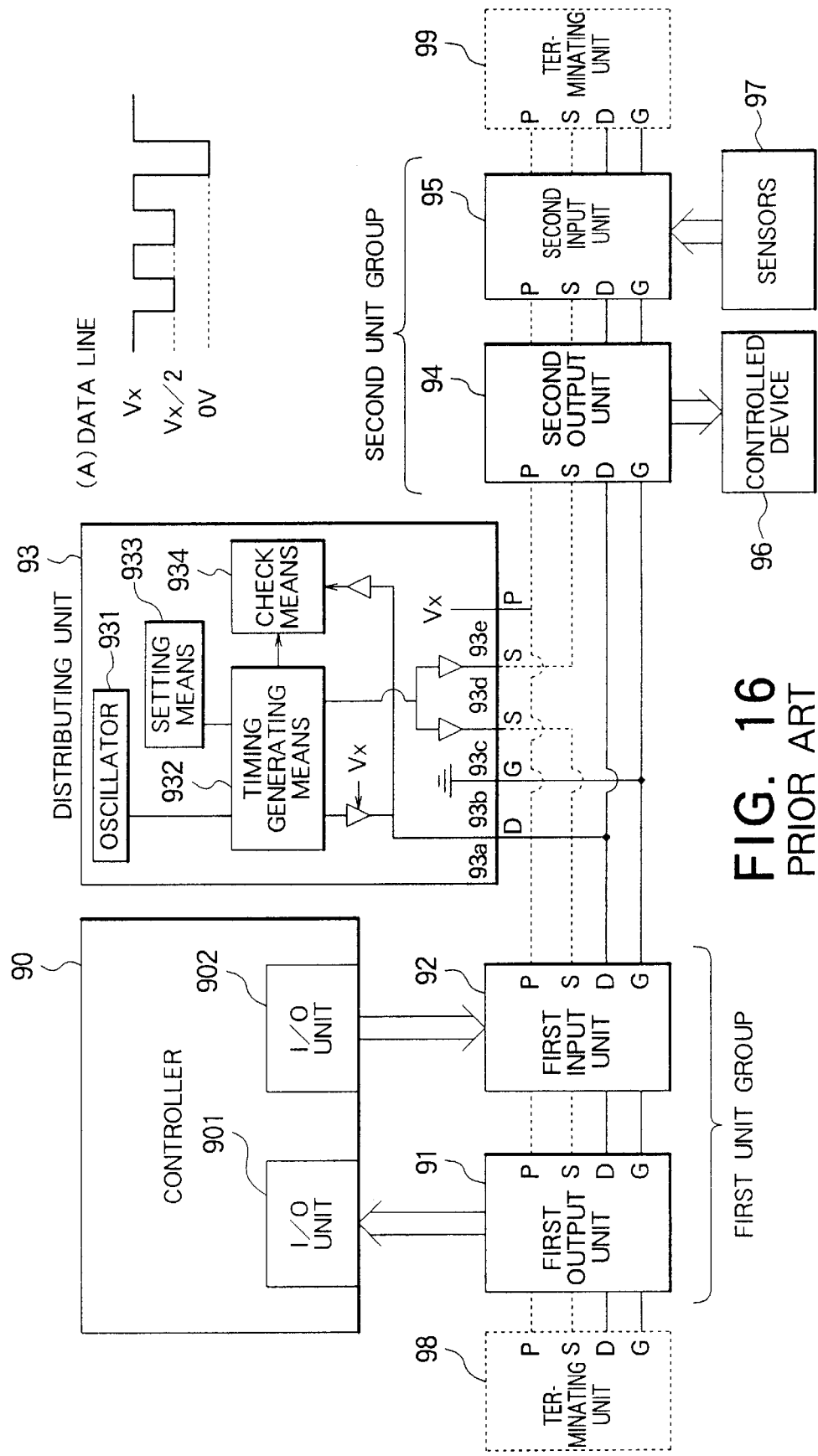
FIG. 16 is a block diagram showing a structure of a control/supervisory system proposed previously.

(2) In the conventional system shown in FIG. 16 in which the terminal is equipped with no functions for ID code setting and comparison, a local station imparted with a function for sending both the end response in response to the ID code (which local station may be referred to as the end response unit) may be installed for monitoring or supervising breakage or the like trouble occurring in the transmission line.

(3) In conjunction with both the first and second embodiments of the invention, it has been described that the central station is imparted with data transfer function for transferring input/output data with an external unit such as sequence controller, programmable controller or the like. However, it is equally possible to provide the central station with only the transmission timing control function and the function for controlling and monitoring or supervising the local stations, wherein the function for transferring input/output data or signals with the sequence controller may be implemented as another unit, as in the case of the first output unit 91 and the first input unit 92 in the conventional system shown in FIG. 16.

(4) With a view to ensuring compatibility with inexpensive simplified systems, the central station may be realized by two separate units, i.e., a unit for generating the transmission timing (constituted by the components 32 to 35 shown in FIG. 4) and a unit serving for the control and supervisory function (constituted by the components 30, 31 and 36 to 38 shown in FIG. 4).

(5) In the control/supervisory signal transmission/reception system described above, the EEPROM is used as the tag memory for the single-bit data in order to record the connection states of the local stations. It should however be mentioned that an ID code memory having a eight-bit data capacity may be employed to this end. Of course, a memory built in a single-chip microcomputer or a memory provided with an external battery back-up function may equally be used.

Accordingly, all suitable modifications and equivalents may be resorted to, falling within the spirit and scope of the invention.

What is claimed is:

1. A control/supervisory signal transmission/reception system for controlling and supervising operations and operating states of a plurality of units to be controlled and supervised, said system including a central station and a plurality of local stations which are interconnected by way of a common data signal line, said units to be controlled/supervised being operatively connected to said local stations, respectively, to be controlled and supervised through said central station, said central station including signal generating means for generating a voltage signal containing a series of pulse-like signals, said pulse-like signals including those having a first voltage level of a first predetermined duration for representing non-data state and those having a second voltage level corresponding substantially to a half of said first voltage level and having a second predetermined duration for representing a data state, clock means for generating a clock signal for controlling a timing at which said pulse-like signals are generated in said central station, wherein data to be sent from said central station to said local stations, data to be sent from said local station to said central station and data to be sent from a given one of said local stations to another local station are transmitted at said second voltage level in combination with a ground potential level, wherein-said central station comprises:
transmitting means for sending out sequentially and repetitively ordinary frames each of which contains a start signal having a first constant duration transmitted at said first voltage level, a data signal containing a plurality of voltage pulses which can selectively assume combinations of said first voltage level and one of said second voltage level and said ground potential level in correspondence to data to be transmitted from said central station to said local stations, an identifier signal representing an identifier code of each of said local stations and an end signal having a waveform differing from that of said data signal, said identifier code having information for identifying each of said local stations; and wherein each of said plurality of local stations comprises:
identifying number setting means for setting an own identifying number assigned previously to each of said local stations;
address setting means for setting a count value indicating an own address of said local station for enabling reception and transmission of said data signal;
data receiving/sending means responding to reception of said frame for fetching a predetermined number of said voltage pulses contained in said data signal, said predetermined number being determined on the basis of the count value indicating said address assigned to said local station;
identifier code extracting means for extracting said identifier code contained in said frame and received by said local station in precedence to said end signal;

comparison means for comparing said extracted identifier code with said own identifying number of said local station; and
end response means responding to coincidence between said identifier code and said own identifying number assigned to said local station, said end response means sending a response to said central station by modulating the level of said end signal which level represents said data state.

2. A control/supervisory signal transmission/reception system according to claim 1,
said central station sending said ordinary frames sequentially in accordance with said identifier codes of said local stations, respectively,
wherein in each of said local stations, operation of said end response means for generating the response signal to said central station is disabled when abnormality is detected in said local station at a time point when response is to be issued by said end response means upon detection of coincidence between said identifier code and said own identifying number, and
wherein when said central station receives no end response from the local station corresponding to the identifier code, said ordinary frame mode is changed over to an extension mode in which extended frames are sequentially sent to said local stations, respectively, each of said extended frames being composed of said start signal, said data signal, said identifier code, an end signal having a waveform differing from that of said end signal of said ordinary frame, and an extension code containing a plurality of bits and inserted in succession to said end signal, wherein said extension code contains a command signal issued by said central station to said local station and a response signal issued by said local station to said central station for messaging states of said units to be controlled/supervised monitored by said local station to said central station.

3. A control/supervisory signal transmission/reception system according to claim 1,
said central station further comprising extended frame transmitting means for sending out sequentially extended frames in an extension mode for detecting states of said units to be controlled/supervised connected to said local stations, respectively, each of said extended frames being composed of said start signal, said data signal, said identifier code, an end signal having a waveform differing from that of said end signal of said ordinary frame, and an extension code containing a plurality of bits and inserted in succession to said end signal,
wherein said extension code contains a command signal issued by said central station to said local station and a response signal issued by said local station to said central station for messaging states of said units to be controlled/supervised monitored by said local station to said central station,
wherein each of said local station includes means for identifying said extended frames discriminatively, and command identifying means for identifying the command signal contained in said extension code, and sending means for sending to said central station information concerning states of said units to be controlled/supervised upon detection of coincidence of said identifier code by modulating said response signal with said information, and
wherein said central station identifies discriminatively said response signals corresponding to said identifier codes and contained in said extended frames, respectively, to thereby supervise said local stations and said units to be controlled/supervised as to occurrence of abnormality.

4. A control/supervisory signal transmission/reception system according to claim 1, wherein said ordinary frame contains additionally a validity bit indicating whether data represented by said data signal contained in said ordinary frame is valid or not, said validity bit being inserted between said identifier code and said end signal, wherein each of said local stations further comprises detecting means for detecting said validity bit, temporarily holding means for temporarily holding received data of plural bits at a timing for the reception, and output register means for outputting the data held by said temporarily holding means to the units to be controlled/supervised provided in association with said local station, and wherein in response to the output of said validity bit detecting means, indicating validity of said data, the data held by said temporarily holding means is loaded in said output register means.

5. A control/supervisory signal transmission/reception system according to claim 1, said central station further comprising storage means for storing connection statuses of said local stations in correspondence to all of said identifier codes which are useable, respectively, wherein said central station sends out onto said data signal line a plurality of ordinary frames in precedence to starting of the control/supervisory operation or alternatively in the course of said control/supervisory operation, each of said ordinary frames being constituted by a start signal field, a data signal field, an identifier code field and an end signal filed, said local station identifier code serving for identifying the local station for which the frame containing said local station identifier code is destined, said plurality of frames containing said local station identifier codes having values varying sequentially from an initial value to a last value useable;

wherein upon detection of coincidence between the local station identifier code contained in the frame as extracted from said data signal line and said own identifying number in each of said local station, said end response means incorporated in said local station modulates correspondingly the signal level contained in said end signal field and representing the data state to thereby issue an end response signal;

wherein said central station identifies discriminatively said end response signal corresponding to said identifier code to thereby write information indicating the response in said storage means at a location corresponding to identifier code; and wherein said central station sends out sequentially the frames having the identifier codes containing the information representing said connection states, to thereby monitor presence and absence of said end responses from said local stations.

6. A control/supervisory signal transmission/reception system according to claim 5, said central station further comprising extended frame transmitting means for sending out sequentially extended frames in an extension mode for detecting states of said units to be controlled/supervised connected to said local stations, respectively, each of said extended frames being composed of said start signal, said data signal, said identifier code, an end signal having a waveform differing from that of said end signal of said ordinary frame, and an extension code containing a plurality of bits and inserted in succession to said end signal, wherein said extension code contains a command signal issued by said central station to said local station and a response signal issued by said local station to said central station for messaging states of said units to be controlled/supervised monitored by said local station to said central station, wherein each of said local station includes means for identifying said extended frames discriminatively, and command identifying means for identifying the command signal contained in said extension code, and sending means for sending to said central station information concerning states of said units to be controlled/supervised upon detection of coincidence of said identifier code by modulating said response signal with said information, and wherein said central station identifies discriminatively said response signals corresponding to said identifier codes and contained in said extended frames, respectively, to thereby supervise said local stations and said units to be controlled/supervised as to occurrence of abnormality.

7. A control/supervisory signal transmission/reception system according to claim 5, wherein said ordinary frame contains additionally a validity bit indicating whether data represented by said data signal contained in said ordinary frame is valid or not, said validity bit being inserted between said identifier code and said end signal, wherein each of said local stations further comprises detecting means for detecting said validity bit, temporarily holding means for temporarily holding received data of plural bits at a timing for the reception, and output register means for outputting the data held by said temporarily holding means to the units to be controlled/supervised provided in association with said local station, and wherein in response to the output of said validity bit detecting means, indicating validity of said data, the data held by said temporarily holding means is loaded in said output register means.

8. A control/supervisory signal transmission/reception system according to claim 5, said central station further comprising extended frame transmitting means for sending out sequentially a plurality of extended frames onto said data signal line in an extension mode for detecting states of said units to be controlled/supervised connected to said local stations, respectively, each of said extended frames being composed of said start signal, said data signal, said identifier code, an end signal having a waveform differing from that of said end signal of said ordinary frame, and an extension code containing a plurality of bits and inserted in succession to said end signal, said identifier code of said extended frames having values varying sequentially from an initial value to a last value usable;

wherein said extension code contains a command signal issued by said central station to said local station and a response signal issued by said local station to said central station for messaging states of said units to be controlled/supervised monitored by said local station to said central station, wherein upon detection of coincidence between said identifier code and said own identifying number upon reception of said extended frame, each of said local stations modulates said response signal contained in said extended frame as received with a signal indicative of type information of said local station, the modulated response signal being sent to said central station; and wherein said central station includes storage means for storing the type information of the local stations in correspondence to the identifier codes thereof, respectively, so that the information represented by said modulated response signals is stored in said storage means in correspondence to the identifier codes, respectively.

9. A control signal system comprising:

a data signal line;

a central station connected to said data signal line and including signal generating means for generating a voltage signal containing a series of pulse-like signals, said pulse-like signals including pulses having a first voltage level of a first predetermined duration for representing a non-data state, said pulse-like signals including pulses having a second voltage level corresponding substantially to one half of said first voltage level and having a second predetermined duration for representing a data state, said central station includes transmitting means for sending out sequentially and repetitively frames, each said frame includes a start signal having a first constant duration transmitted at said first voltage level, a data signal containing a plurality of voltage pulses which are selective combinations of said first voltage level and one of said second voltage level and a ground potential level in correspondence to data to be transmitted from said central station, an identifier signal representing an identifier code and an end signal having a waveform differing from said data signal;

a plurality of local stations connected to said data signal line, each said local station including:

identifying number setting means for setting a previously assigned own identifying number to each of said local stations, data receiving/sending means responding to reception of said frames and for fetching a predetermined number of said voltage pulses contained in said data signal, identifier code extracting means for extracting said identifier code contained in said frame, comparison means for comparing said extracted identifier code with said own identifying number, end response means responding to a match between said identifier code and said own identifying number, said end response means sending a response to said central station by modulating a level of said end signal, said level of said end signal representing said data state.

10. A control system in accordance with claim 9, wherein:

said data to be sent from said central station to said local stations, and data to be sent from said local stations to said central station are sent within said frames.

* * * * *